(12) United States Patent  
Sakakibara et al.

(10) Patent No.: US 9,257,093 B2  
(45) Date of Patent: *Feb. 9, 2016

(54) IMAGE DISPLAY APPARATUS AND IMAGE ADJUSTING METHOD

(71) Applicant: SEIKO EPSON CORPORATION, Tokyo (JP)

(72) Inventors: Takefumi Sakakibara, Matsumoto (JP); Yuji Mochizuki, Shiojiri (JP); Osamu Kumamoto, Azumino (JP); Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,550

(22) Filed: Mar. 11, 2013

(65) Prior Publication Data

US 2013/0187851 A1    Jul. 25, 2013

Related U.S. Application Data

(63) Continuation of application No. 12/435,857, filed on May 5, 2009, now abandoned.

(30) Foreign Application Priority Data

Aug. 10, 2005 (JP) ................. 2005-231700  
Aug. 10, 2005 (JP) ................. 2005-231701  
Aug. 10, 2005 (JP) ................. 2005-231702

(51) Int. Cl.  
*H04N 9/69* (2006.01)  
*H04N 5/202* (2006.01)

(Continued)

(52) U.S. Cl.  
CPC ............... *G09G 5/04* (2013.01); *G09G 3/002* (2013.01); *G09G 3/006* (2013.01); *H04N 5/202* (2013.01);

(Continued)

(58) Field of Classification Search  
CPC ............... G09G 2360/16; G09G 2320/0276; G02F 2203/30; H04N 9/69; H04N 5/202  
USPC ................................... 345/596, 690  
See application file for complete search history.

(56) References Cited

U.S. PATENT DOCUMENTS 4,404,590 A    9/1983    Mayer et al.  
5,473,343 A   12/1995   Kimmich et al.

(Continued)

FOREIGN PATENT DOCUMENTS

CN    1573510 A    2/2005  
CN    2692734 Y    4/2005

(Continued)

OTHER PUBLICATIONS

European Search Report dated Oct. 26, 2009 issued in European Application No. 06 01 6615.

(Continued)

*Primary Examiner* — Matthew D Salvucci  
(74) *Attorney, Agent, or Firm* — Oliff PLC

(57) ABSTRACT

An image display apparatus includes: an image signal processing unit which adjusts an input grayscale values included in an input image signal according to a predetermined grayscale characteristic; a display unit which displays an image based on an image signal included in an output grayscale value adjusted by the image signal processing unit; and a grayscale characteristic changing unit which changes a correlation between the input and output grayscale values defined based on the grayscale characteristic.

7 Claims, 19 Drawing Sheets

(51) Int. Cl.
 *H04N 21/41* (2011.01)
 *H04N 21/431* (2011.01)
 *H04N 21/485* (2011.01)
 *G09G 5/04* (2006.01)
 *G09G 3/00* (2006.01)
 *H04N 5/445* (2011.01)
 *H04N 5/74* (2006.01)
 *H04N 9/31* (2006.01)
 *H04N 5/57* (2006.01)

(52) U.S. Cl.
 CPC ............ *H04N 5/44513* (2013.01); *H04N 5/74* (2013.01); *H04N 9/3182* (2013.01); *H04N 9/3191* (2013.01); *H04N 9/3197* (2013.01); *H04N 9/69* (2013.01); *H04N 21/4122* (2013.01); *H04N 21/4318* (2013.01); *H04N 21/4854* (2013.01); *G09G 2320/0242* (2013.01); *G09G 2320/0673* (2013.01); *H04N 5/57* (2013.01); *H04N 2005/745* (2013.01)

(56) References Cited

U.S. PATENT DOCUMENTS

| | | | |
|---|---|---|---|
| 5,764,216 A * | 6/1998 | Tanaka et al. | 345/87 |
| 6,067,085 A | 5/2000 | Modh et al. | |
| 6,498,660 B2 | 12/2002 | Haltmaier | |
| 6,795,091 B2 | 9/2004 | Kim | |
| 7,164,428 B2 | 1/2007 | Wada et al. | |
| 7,312,795 B2 | 12/2007 | Aso et al. | |
| 2002/0070948 A1 | 6/2002 | Murai et al. | |
| 2004/0057061 A1* | 3/2004 | Bochkarev | 358/1.9 |
| 2004/0246276 A1* | 12/2004 | Koyama | 345/690 |
| 2005/0052528 A1* | 3/2005 | Ohkawa et al. | 348/14.08 |
| 2005/0094170 A1 | 5/2005 | Ichitani | |
| 2005/0253797 A1 | 11/2005 | Kamada et al. | |
| 2006/0017678 A1* | 1/2006 | Shiomi | 345/89 |
| 2006/0072799 A1 | 4/2006 | McLain | |
| 2006/0126958 A1 | 6/2006 | Kang | |
| 2006/0164442 A1 | 7/2006 | Furuhata | |
| 2006/0215127 A1 | 9/2006 | Peterson | |
| 2006/0256355 A1 | 11/2006 | Karito | |
| 2008/0074374 A1 | 3/2008 | Shiomi et al. | |

FOREIGN PATENT DOCUMENTS

| | | |
|---|---|---|
| EP | 0-583-898 A2 | 2/1994 |
| EP | 0-947-955 A2 | 10/1999 |
| EP | 1-742-461 A1 | 1/2007 |
| JP | A-61-145594 | 7/1986 |
| JP | A-64-074678 | 3/1989 |
| JP | H01-267783 A | 10/1989 |
| JP | A-3-189693 | 8/1991 |
| JP | A-4-217186 | 8/1992 |
| JP | A-6-70168 | 3/1994 |
| JP | A-7-261731 | 10/1995 |
| JP | A-10-91131 | 4/1998 |
| JP | A-2001-350456 | 12/2001 |
| JP | A-2003-60914 | 2/2003 |
| JP | A-2003-122336 | 4/2003 |
| JP | A-2004-113627 | 4/2004 |
| JP | A-2005-99620 | 4/2005 |
| KR | 2002-0069932 A | 9/2002 |
| KR | 2003-0084198 A | 11/2003 |
| KR | 2004-0092237 | 11/2004 |

OTHER PUBLICATIONS

Japanese Office Action issued on Jul. 27, 2010 in Japanese Application No. 2005-231701 (with translation).
Japanese Office Action issued on Oct. 19, 2010 in Japanese Application No. 2005-231701 (with translation).
Dec. 11, 2012 Office Action received in U.S. Appl. No. 12/435,857.
Aug. 1, 2012 Office Action received in U.S. Appl. No. 12/435,857.
Dec. 28, 2011 Office Action received in U.S. Appl. No. 12/435,857.
Nov. 24, 2011 Office Action received in U.S. Appl. No. 12/435,857.

* cited by examiner

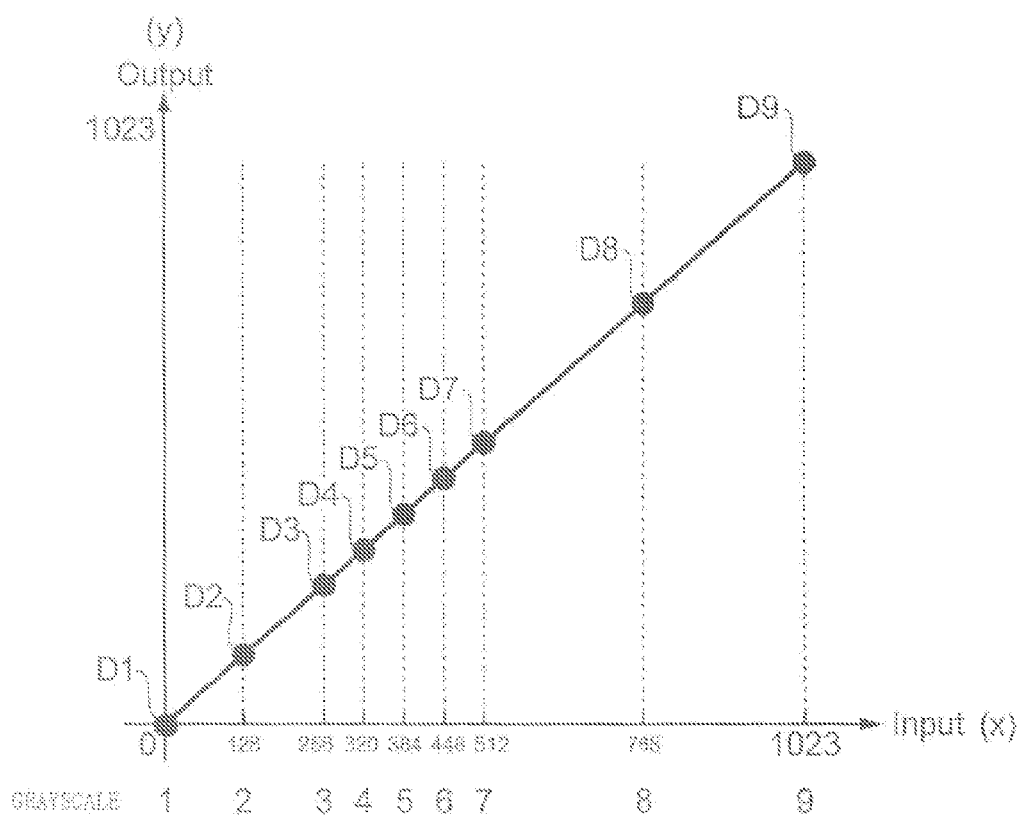

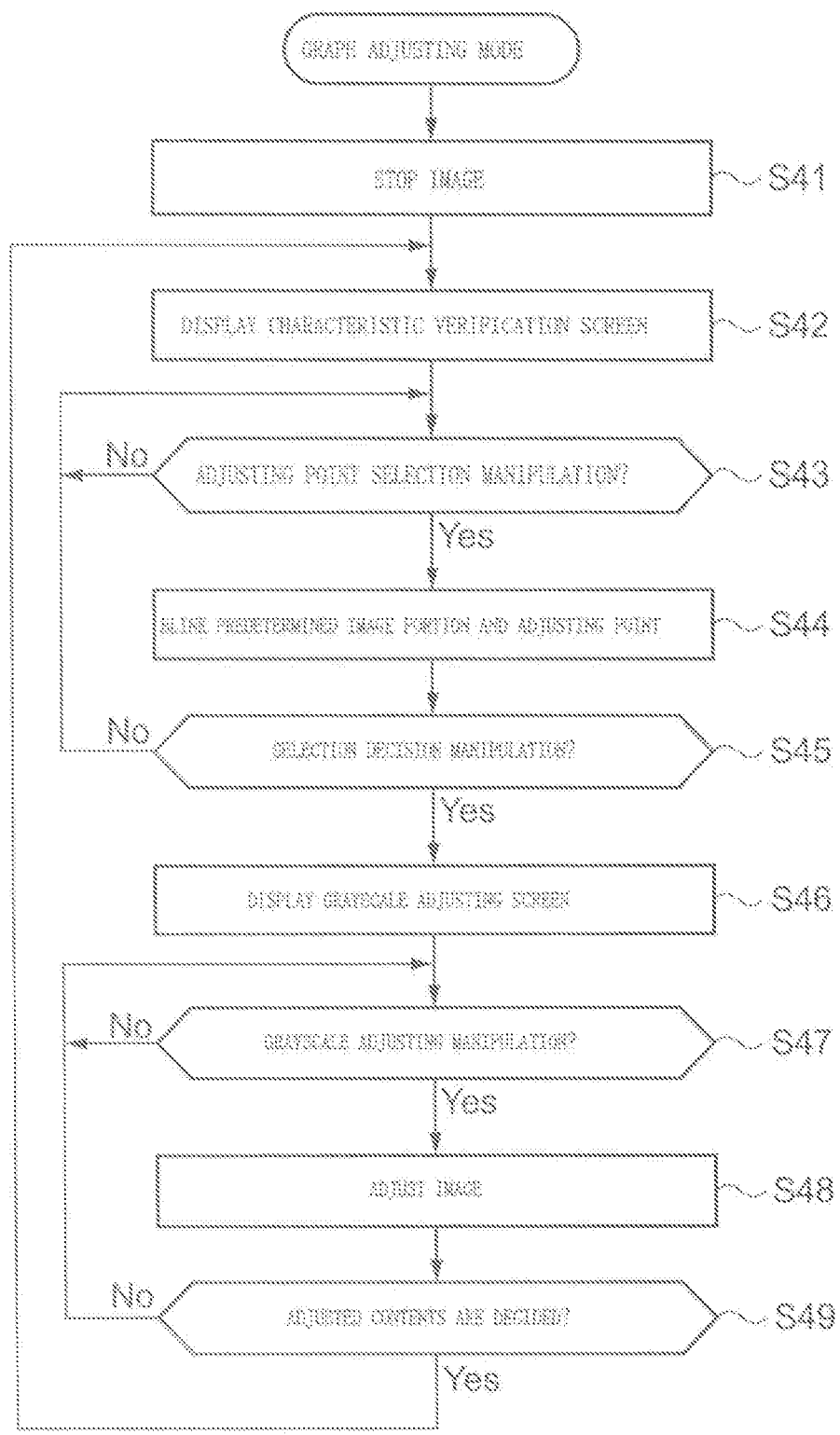

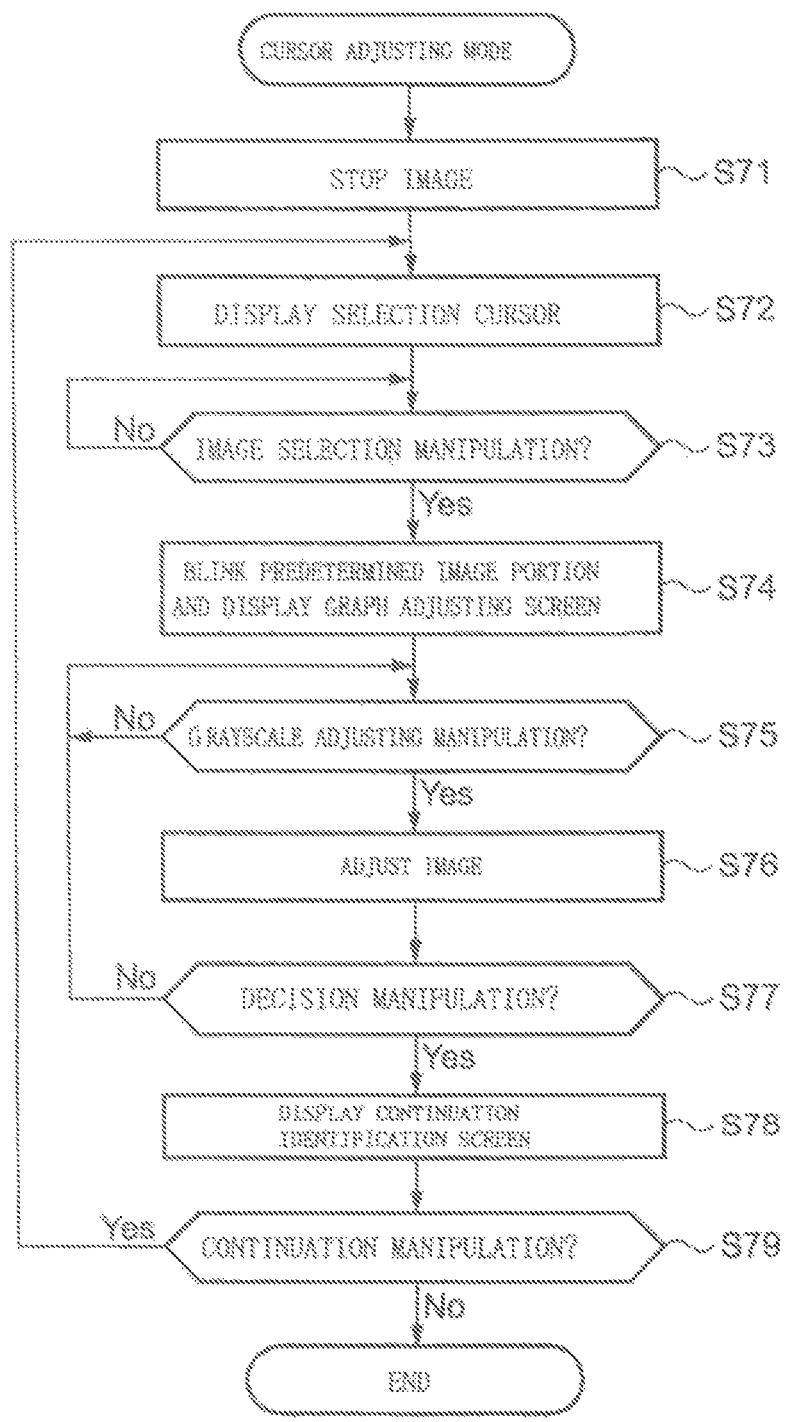

IMAGE DISPLAY APPARATUS AND IMAGE ADJUSTING METHOD

This is a Continuation of application Ser. No. 12/435,857 filed on May 5, 2009, which in turn is a continuation of application Ser. No. 11/462,172 filed Aug. 3, 2006. This application claims the benefit of Japanese Patent Application Nos. 2005-231700 2005-231701, and 2005-231702, in which all were filed on Aug. 10, 2005. The disclosure of the prior applications is hereby incorporated by reference herein in its entirety.

BACKGROUND

1. Technical Field

The present invention relates to an image display apparatus for displaying an image represented by an image signal and an image adjusting method for the image display apparatus.

2. Related Art

In the related art, an image display apparatus capable of adjusting an image represented by an image signal according to contents of the image or projection environment has been proposed. For example, in a projector disclosed in JP-A-2005-99620, three types of selection items "dynamic", "natural", and "soft" are provided, and γ values corresponding to the adjusting items are stored. The projector sets the γ value according to selected adjusting items and performs grayscale adjusting (hereinafter, referred to a "γ correction") on the image signal.

In the related art, when the image adjusting is performed by an image display apparatus, a small number of predetermined selection items are selected, so that the adjusting is not smoothly performed.

If the number of adjusting items may be increased in order to implement the smooth image adjusting, a change of the image involved with the image adjusting is not easy to perceive in advance. In addition, it is difficult to determine which adjusting items are selected to perform desired image adjusting.

SUMMARY

An advantage of some aspects of the invention is to provide an image display apparatus capable of easily performing smooth image adjusting according to user's preferences and an image adjusting method for the image display apparatus.

According to an aspect of the invention, there is provided an image display apparatus comprising: an image signal processing unit which adjusts an input grayscale values included in an input image signal according to a predetermined grayscale characteristic; a display unit which displays an image based on an image signal included in an output grayscale value adjusted by the image signal processing unit; and a grayscale characteristic changing unit which changes a correlation between the input and output grayscale values defined based on the grayscale characteristic.

According to such a construction, since the grayscale characteristic changing unit which changes the grayscale characteristic for adjusting the image signal, that is, the correlation between the input and output grayscale values is provided, it is possible to smoothly perform the image adjusting according to user's preferences by changing the correlation.

The image display apparatus may further comprise an OSD unit which displays a selection screen used to decide a to-be-used grayscale characteristic among a plurality of the grayscale characteristics including a custom characteristic capable of changing the correlation so as to overlap the image; and a manipulator which receives a selection manipulation of selecting one of a plurality of the grayscale characteristics and a decision manipulation of deciding the grayscale characteristic selected by the selection manipulation in a state that the selection screen is displayed, wherein the image signal processing unit adjusts the image signal according to the grayscale characteristic finally decided by the decision manipulation and adjusts the image signal according the grayscale characteristic selected when the selection manipulation is performed in a state that the selection screen is overlapped.

According to such a construction, in a step where the selection manipulation for selecting one of a plurality of the grayscale characteristics is performed, the adjusting according to the selected grayscale characteristic is performed on the image signal, so that it is possible to select the to-be-used grayscale characteristic while the adjusted image is identified. Namely, it is possible to easily select the to-be-used grayscale characteristic.

In the aforementioned image display apparatus, the grayscale characteristic changing unit may include: an OSD unit which displays a selection cursor used to select a desired image portion of the image, a characteristic identification screen including a graph representing the correlation, and a grayscale adjusting screen used to change the correlation so as to overlap the image; and a manipulator which is used to perform a starting manipulation of starting the changing of the correlation, an image selection manipulation of selecting the image portion by using the selection cursor, and an image decision manipulation of deciding the image portion selected by the image selection manipulation, wherein, when the starting manipulation is performed, the image is overlapped with the selection cursor, wherein, when the image selection manipulation is performed, the characteristic identification screen is overlapped with the image signal, and an adjusting point corresponding to the grayscale value of the selected image portion is distinctively represented on the graph, and wherein, when the image decision manipulation is performed, the grayscale adjusting screen used to change the correlation at the adjusting point is overlapped with the image.

According to such a construction, in the grayscale characteristic changing unit, when the image selection manipulation of selecting the image portion is performed, the adjusting point corresponding to the grayscale value of the selected image portion is distinctively displayed, and when the image decision manipulation of deciding the selected image portion is performed, the grayscale adjusting screen used to change the correlation at the adjusting point is displayed. Therefore, the adjusting point where the correlation is to be changed can be selected from the image, so that it is possible to easily perform desired image adjusting. In addition, in order to distinctively represent the adjusting point, the adjusting point may be blinked and displayed with a color tone different from other adjusting points.

In the aforementioned image display apparatus, the grayscale characteristic changing unit may include: an OSD unit which displays a selection cursor used to select a desired image portion of the image on the image; and a manipulator which is used to performs a starting manipulation of starting the changing of the correlation and an image selection manipulation of selecting the image portion by using the selection cursor, wherein, when the starting manipulation is performed, the image is overlapped with the selection cursor, and wherein, when the image selection manipulation is performed, an image portion having a grayscale value substantially equal to that of the selected image portion is blinked, and the grayscale adjusting screen is overlapped with the image so as to change the correlation in the blinked image portion.

According to such a construction, when the image selection manipulation of selecting the image portion is performed, the grayscale characteristic changing unit blinks the image portion having a grayscale substantially equal to that of the selected image portion, so that portions of which correlation is to changed can be easily visually perceived.

According to another aspect of the invention, there is provided an image display apparatus for displaying an image represented by an image signal on a display unit, comprising: a storage unit which stores a plurality of grayscale characteristics including a custom characteristic capable of customizing a characteristic used to adjust a grayscale characteristic in the image signal; an OSD unit which overlaps a selection screen used to select one of a plurality of the grayscale characteristics with the image signal; a manipulator which is used to perform at least a manipulation of selecting one of the grayscale characteristics from the selection screen and a manipulation of deciding selection contents; and an image signal processing unit which performs an image process including adjusting of the grayscale characteristic on the image signal, wherein, where a manipulation of selecting the grayscale characteristic on the selection screen is performed by using the manipulator, the image signal processing unit adjusts the grayscale characteristic of the image signal based on the selected grayscale characteristic and displays an image on the display unit based on the image signal subjected to the adjusting.

According to such a construction, the storage unit stores a plurality of the grayscale characteristics including the custom characteristic which can customize the characteristic used for the image adjusting. Therefore, the image display apparatus has a large number of selection items of the grayscale characteristic, and the selection items can be in accordance with the user's preferences.

When the manipulation of selecting the grayscale characteristic in the selection screen is performed in the manipulator, the image signal processing unit adjusts the grayscale characteristic of the image signal based on the selected grayscale characteristic and displays the image on the display unit based on the image signal subjected to the adjusting. Therefore, in a step of selecting the adjusted contents, it is possible to identify the image including the adjusted contents in a background of the selection screen.

Accordingly, in the image display apparatus according to the aspect of the invention, the image adjusting can be performed according to the user's preferences, so that it is possible to identify the image including the adjusted contents in the step of selecting the adjusted contents.

In the aforementioned image display apparatus, the selection screen may include a graph representing a correlation between input and output grayscale levels of the selected grayscale characteristic.

According to such a construction, the selection screen may include a graph representing a correlation between input and output grayscale levels of the selected grayscale characteristic, so that the graph representing the selected grayscale characteristic can be visually perceived.

Accordingly, in the image display apparatus according to the aspect of the invention, in the step of selecting the adjusted contents, it is possible to identify the graph representing the grayscale characteristic of the image as well as the image including the adjusted contents.

In the aforementioned image display apparatus, when a manipulation of selecting the custom characteristic of the selection screen and deciding selection contents by using the manipulator is performed, the image signal processing unit may perform an image process on the image signal based on a grayscale characteristic included in the custom characteristic, wherein the OSD unit stops the overlapping of the selection screen and overlaps a graph adjusting screen including a graph representing a grayscale characteristic at an initial setting of the custom characteristic with the image signal, and wherein the graph adjusting screen includes a plurality of dot displayed portions which represent output grayscale levels at a plurality of adjusting points disposed according to input grayscale levels and are used to adjust the grayscale characteristic.

According to such a construction, when the custom characteristic is selected and decided, the graph adjusting screen including the graph representing the grayscale characteristic at the initial setting of the custom characteristic is displayed, and the graph adjusting screen includes a plurality of the dot displayed portions which represent the output grayscale levels at a plurality of the adjusting point disposed according to the input grayscale levels and are used to adjust the grayscale characteristic. Therefore, due to the graph adjusting screen, it is possible to perform the adjusting of the grayscale characteristic while the grayscale characteristic at the initial setting of the custom characteristic is identified.

Accordingly, in the image display apparatus according to the aspect of the invention, it is possible to perform the image adjusting according to the user's preferences while the grayscale characteristic is identified by using the graph.

In the aforementioned image display apparatus, when a manipulation of selecting the custom characteristic of the selection screen and deciding selection contents by using the manipulator is performed, the OSD unit may stop the overlapping of the selection screen and overlap a characteristic identification screen which is a graph representing a grayscale characteristic at an initial setting of the custom characteristic with the image signal, wherein the image signal processing unit performs an image process on the image signal based on a grayscale characteristic included in the custom characteristic, and wherein, when a manipulation of selecting one of a plurality of dot displayed portions representing output grayscale levels at the adjusting points in the graph is performed by using the manipulator, the OSD unit stops the overlapping of the characteristic identification screen and overlaps a grayscale adjusting screen which is smaller than the image and used to adjust the output grayscale level at the selected adjusting point with the image signal.

According to such a construction, when the custom characteristic is selected and decided, the characteristic identification screen which is the graph representing the grayscale characteristic at the initial setting of the custom characteristic is displayed. Therefore, due to the characteristic identification screen, it is possible to identify the grayscale characteristic at the initial setting of the custom characteristic.

In addition, when a manipulation of selecting one of a plurality of dot displayed portions representing output grayscale levels at the adjusting points in the graph of the characteristic identification screen is performed, the OSD unit stops the overlapping of the characteristic identification screen and overlaps the grayscale adjusting screen which is smaller than the image of the characteristic identification used to adjust the output grayscale level at the selected adjusting point with the image signal. Therefore, due to the grayscale adjusting screen, it is possible to perform the adjusting of the output grayscale level at the selected adjusting point.

Accordingly, in the image display apparatus according to the aspect of the invention, it is possible to perform the image adjusting according to the user's preferences after the grayscale characteristic is identified by using the graph.

In the aforementioned image display apparatus, when a manipulation of selecting the custom characteristic of the selection screen and deciding selection contents by using the manipulator is performed, the OSD unit may stop the overlapping of the selection screen and overlap a selection cursor which is used to select a desired image portion on the image with the image signal, wherein the image signal processing unit stops an image which is subjected to an image process based on a grayscale characteristic included in the custom characteristic, and wherein, when a manipulation of selecting the image portion is performed by using the selection cursor, the OSD unit overlaps a graph adjusting screen representing output grayscale levels at a plurality of adjusting points disposed according to input grayscale levels used to adjust the grayscale characteristic and including a plurality of dot displayed portions capable of adjusting the output grayscale level with the image signal.

According to such a construction, by using the selection and decision of the custom characteristic as a trigger, the selection cursor is displayed, and the image is stopped. Therefore, although the moving image is not easy to select, the selection of the image portion by using the selection cursor can be easily performed on the still image.

In addition, when a manipulation of selecting the image portion is performed by using the selection cursor, the OSD unit overlaps a graph adjusting screen representing output grayscale levels at a plurality of adjusting points disposed according to input grayscale levels used to adjust the grayscale characteristic and including a plurality of dot displayed portions capable of adjusting the output grayscale level with the image signal. Therefore, due to the graph adjusting screen, it is possible to perform the adjusting of the grayscale characteristic while the grayscale characteristic is identified.

Accordingly, in the image display apparatus according to the aspect of the invention, a desired image portion can be easily selected, so that it is possible to perform the image adjusting according to the user's preferences while the grayscale characteristic is defined confirmed by using the graph.

In the aforementioned image display apparatus, when a manipulation of selecting the custom characteristic of the selection screen and deciding selection contents by using the manipulator is performed, the OSD unit may stop the overlapping of the selection screen and overlap a selection cursor used to select a desired image portion on the image with the image signal, wherein the image signal processing unit stops an image which is subjected to an image process based on a grayscale characteristic included in the custom characteristic, and wherein, when a manipulation of selecting the image portion is performed by using the selection cursor, the OSD unit overlaps a grayscale adjusting screen used to adjust an output grayscale level at an adjusting point of the grayscale characteristic corresponding g to the selected image portion with the image signal.

According to such a construction, by using the selection and decision of the custom characteristic as a trigger, the selection cursor is displayed, and the image is stopped. Therefore, although the moving image is not easy to select, the selection of the image portion by using the selection cursor can be easily performed on the still image.

In addition, when a manipulation of selecting the image portion is performed by using the selection cursor, the OSD unit overlaps the grayscale adjusting screen used to adjust the output grayscale level at the adjusting point of the grayscale characteristic corresponding to the selected image portion with the image signal. Therefore, due to the grayscale adjusting screen, it is possible to perform the adjusting of the output grayscale level at the selected adjusting point.

Accordingly, in the image display apparatus according to the aspect of the invention, a desired image portion can be easily selected, so that it is possible to perform the image adjusting according to the user's preferences.

In the aforementioned image display apparatus, when an adjusting manipulation of adjusting a grayscale level in the graph adjusting screen or the grayscale adjusting screen is performed, the image signal processing unit may sequentially adjust a grayscale value of an image portion corresponding to the adjusting point in the image according to the output grayscale level which is subjected to the adjusting manipulation.

According to such a construction, when an adjusting manipulation of adjusting a grayscale level in the graph adjusting screen or the grayscale adjusting screen is performed, the image signal processing unit sequentially adjusts a grayscale value of an image portion corresponding to the adjusting point in the image according to the output grayscale level which is subjected to the adjusting manipulation. Therefore, in the step of performing the adjusting, it is possible to identify the image including the adjusted contents in real-time.

Accordingly, in the image display apparatus according to the aspect of the invention, the image adjusting can be performed according to the user's preferences, in the step of performing the adjusting, it is possible to identify the image including the adjusted contents in real-time.

In the aforementioned image display apparatus, when a manipulation of selecting the custom characteristic of the selection screen and deciding selection contents by using the manipulator is performed, before a graph adjusting mode which uses a graph and starts from the graph adjusting screen and the characteristic identification screen or a cursor adjusting mode which starts from the selection cursors proceeds, the OSD unit may stop the overlapping of the selection screen and overlap a branch screen used to select one of the graph adjusting mode and the cursor adjusting mode with the image signal.

According to such a construction, by using the selection and decision of the custom characteristic as a trigger, the OSD unit overlaps the branch screen used to select one of the graph adjusting mode and the cursor adjusting mode with the image signal. Therefore, due to the branch screen, it is possible to select one of the graph adjusting mode and the cursor adjusting mode.

Accordingly, in the image display apparatus according to the aspect of the invention, it is possible to select the adjusting method according to the user's preferences.

In the aforementioned image display apparatus, a selection record that the graph selected in the branch screen or the cursor image adjusting mode is selected may be stored in the storage unit, and when a manipulation of selecting the custom characteristic of the selection screen is performed by using the manipulator, the OSD unit overlaps the branch screen with the image signal in a state that an image adjusting mode in the selection record stored in the storage unit is selected.

According to such a construction, a selection record is stored in the storage unit, and when a manipulation of selecting the custom characteristic of the selection screen is performed by using the manipulator, the OSD unit overlaps the branch screen with the image signal in a state that an image adjusting mode in the selection record stored in the storage unit is selected. The branch screen is displayed in a state that the branch screen includes user's selection records. Therefore, a probability that the user performs the selection manipulation for the adjusting mode is reduced.

Accordingly, the image display apparatus according to the aspect of the invention can be conveniently used.

In the aforementioned image display apparatus, a size of each of manipulation screens including the selection screen, the graph adjusting screen, the characteristic identification screen, the grayscale adjusting screen, and the branch screen may be ¼ or less of the image.

According to such a construction, the size of each of manipulation screens including the selection screen, the graph adjusting screen, the characteristic identification screen, the grayscale adjusting screen, and the branch screen is ¼ or less of the image. Therefore, although the area covered by the manipulation screen is excluded, the image having ¾ or more of the entire area can be identified.

Accordingly, in the image display apparatus according to the aspect of the invention, the image adjusting can be performed while the image state is identified.

In the aforementioned image display apparatus, each of manipulation screens including the graph adjusting screen, the characteristic identification screen, the grayscale adjusting screen, and the branch screen may be disposed in an inner side of one of four corners of the image having a substantially rectangular shape as an initial setting, wherein the OSD unit moves the position of the manipulation screen within an range of the image so as not to overlap the selected image portion.

According to such a construction, each of the manipulation screens is disposed in an inner side of one of four corners of the image having a substantially rectangular shape as an initial setting. Therefore, the central portion of the image is not covered by the manipulation screens.

In addition, the OSD unit moves the position of the manipulation screen in an inner region of the image so that the selected image portion cannot be overlapped with the manipulation screen. Therefore, the adjusting state of the selected image portion which needs to be most carefully adjusted can be identified at the time of the adjusting.

Accordingly, in the image display apparatus according to the aspect of the invention, the image adjusting can be performed while the image state is always identified.

In the aforementioned image display apparatus, a grayscale characteristic in a default initial setting of the custom characteristic may be changed, and the grayscale characteristic may be set to one grayscale characteristic among a plurality of the grayscale characteristics including a linear grayscale characteristic stored in the storage unit.

According to such a construction, the grayscale characteristic in the default initial setting of the custom characteristic can be changed and is set to one grayscale characteristic among a plurality of the grayscale characteristics including a linear grayscale characteristic stored in the storage unit. Therefore, the grayscale characteristic according to the user's preferences can be selected as a reference characteristic.

Accordingly, in the image display apparatus according to the aspect of the invention, the image adjusting according to the user's preferences can be performed.

In the aforementioned image display apparatus, the custom characteristic adjusted in the graph adjusting screen or the grayscale adjusting screen is stored in the storage unit and displayed as one of the selection items of a plurality of the grayscale characteristics when the selection screen is displayed.

According to such a construction, the adjusted custom characteristic is stored in the storage unit and displayed as one of the selection items of a plurality of the grayscale characteristics when the selection screen is displayed. Therefore, the adjusted custom characteristics are stored, so that it can be easily reproduced.

Accordingly, the image display apparatus according to the aspect of the invention can be conveniently used.

In the aforementioned image display apparatus, the image display apparatus is a projector including: a light source unit which supplies light; an optical modulation device which modulates light emitted from the light source unit into a modulated light representing an image defined by the image signal; and a projection lens which magnifies and projects the modulated light.

The projector projects the image on the screen, that is, the projection plane to display the image. Therefore, the projected image needs to be adjusted so as to be suitable for projection environment according to brightness of the projection environment, a color tone of the installed screen, or the like. For this reason, a high-performance image adjusting method of performing the image adjusting frequently is required.

According to such a construction, the image display apparatus is a projector which modulates light emitted from the light source unit into a modulated light representing an image defined by an image signal by using an optical modulation device and magnifies and projects the modulated light by using the projection lens. Therefore, the projected image on a large-sized screen can be subjected to the image adjusting so as to be suitable for the projection environment based on a plurality of the grayscale characteristics including the custom characteristic which can be customized.

Accordingly, the image display apparatus according to the aspect of the invention is suitable for a projector.

According to still another aspect of the invention, there is provided an image display apparatus for displaying an image represented by an image signal on a display unit, comprising: an OSD unit which overlaps a selection cursor used to select a desired image portion of the image, a characteristic identification screen including a graph representing a correlation between input and output grayscale levels of a grayscale characteristic at an initial setting of the image, and a grayscale adjusting screen used to adjust grayscales of a plurality of adjusting points in the grayscale characteristic of the image with the image signal; a manipulator which is used to perform at least a manipulation of starting adjusting of the grayscale characteristic of the image, a selection manipulation of selecting the image portion by using the selection cursor, and a manipulation of deciding the selected image portion; and an image signal processing unit which stops the image and allows the OSD unit to display the selection cursor on the display unit when image adjusting including the grayscale characteristic adjusting is performed on the image signal and a manipulation of performing the image adjusting is performed by using the manipulator, wherein, when a manipulation of selecting the image portion by using the selection cursor is performed in the manipulator, the OSD unit overlaps the characteristic identification screen where the adjusting point corresponding to a grayscale of the selected image portion is blinked or a color tone of the adjusting point is changed with the image signal, and wherein, when a manipulation of deciding the selected image portion is performed in the manipulator, the OSD unit overlaps the grayscale adjusting screen of the adjusting point corresponding to the grayscale of the selected image portion with the image signal.

According to such a construction, when the manipulation for the image adjusting is performed, the image signal processing unit stops the image and displays the selection cursor for selecting the desired image portion on the image. Even in case of a moving image where the image portion is not easy to selection due to a change of the image, since the image is stopped, so that the image portion can be easily selected. In addition, the desired image portion can be selected from the still image by using the selection cursor.

When the manipulation of selecting the image portion by using the selection cursor is performed in the manipulator, the OSD unit blinks the adjusting point corresponding to the grayscale of the selected image portion or overlaps the characteristic identification screen where the color tone of the adjusting point is changed with the image signal. The position of the image portion in the grayscale characteristic of the entire image is distinctively represented on the graph. Accordingly, the adjusting point in the grayscale characteristic of the entire image can be identified by using the graph before the grayscale adjusting is performed.

In addition, when the manipulation of deciding the selected image portion is performed by using the manipulator, the OSD unit overlaps the grayscale adjusting screen at the adjusting point corresponding to the grayscale of the selected image portion with the image signal. Therefore, due to the grayscale adjusting screen, the grayscale adjusting of the selected image portion can be performed.

Accordingly, in the image display apparatus according to the aspect of the invention, the desired adjusting portion can be selected from the displayed image, and the image adjusting for the selected adjusting portion can be performed after the grayscale characteristic of the entire image is identified.

In the aforementioned image display apparatus, the image signal processing unit may comprise: a gamma correcting unit which corrects one of a plurality of reference grayscale characteristics defined in advance so that a grayscale characteristic unique to the display unit is suitable for at least installation environment; and a grayscale point adjusting unit which adjusts output grayscale values at a plurality of adjusting points disposed according to input levels in the reference grayscale characteristic, wherein grayscale adjusting for the image signal in the image signal processing unit is performed based on a grayscale characteristic obtained by combining grayscale correction in the gamma correcting unit and grayscale adjusting in the grayscale point adjusting unit, and wherein, when adjusting for the output grayscale value in the grayscale adjusting screen for the selected adjusting point is performed, the grayscale point adjusting unit changes the output grayscale value of the adjusting point according to adjusted contents.

The image signal processing unit comprises: a gamma correcting unit which corrects one of a plurality of reference grayscale characteristics defined in advance so that a grayscale characteristic unique to the display unit is suitable for at least installation environment; and a grayscale point adjusting unit which adjusts output grayscale values at a plurality of adjusting points disposed according to input levels in the reference grayscale characteristic. The functions are performed by individual dedicated units. Therefore, since the dedicated constructions can be formed, it is possible to simplify the constructions.

In addition, the grayscale adjusting to the image signal in the image signal processing unit is performed by using the grayscale characteristic obtained by combining the grayscale correction in the gamma correcting unit and the grayscale adjusting in the grayscale point adjusting unit. Therefore, due to the two adjusting portions, a highly-accurate grayscale adjusting can be performed.

When the adjusting of the output grayscale value in the grayscale adjusting screen of the selected adjusting point is performed, the grayscale point adjusting unit changes the output grayscale value of the adjusting point according to the adjusted contents. Therefore, the image on the background of the grayscale adjusting screen can be updated by an image including the adjusted contents in real-time.

Accordingly, in the image display apparatus according to the aspect of the invention, since the highly-accurate grayscale adjusting can be performed by using a simple grayscale adjusting construction, the image including the adjusted contents can be identified in real-time.

In the aforementioned image display apparatus, the selection cursor includes a pixel selection portion having a size capable of selecting three or more plural consecutive pixels among the pixels in the displayed unit, and wherein the adjusting point of the grayscale characteristic corresponding to the selected image portion is obtained by selecting an adjusting point having an input grayscale level closest to an average value of grayscale values of a plurality of the pixels selected by the pixel selection portion or an average value excluding maximum and minimum values from the grayscale values of a plurality of the pixels selected by the pixel selection portion.

According to such a construction, the selection cursor includes the pixel selection portion which has a size capable of selecting three or more plural consecutive pixels among the pixels in the display unit. Therefore, the selected portion according to the user's intention can be determined based on the pixel data in a plurality of the pixels having a width.

In addition, with respect to the adjusting point of the grayscale characteristic corresponding to the selected image portion, the adjusting point having the input grayscale level closest to the average value of the grayscale values for a plurality of the pixels selected by the pixel selection portion or the average value excluding the maximum and minimum grayscale values from the grayscale values for a plurality of the pixels selected by the pixel selection portion is selected. Therefore, since the influence of the pixel data including the noise can be reduced, the adjusting point corresponding to the image portion according to the user's intention can be selected.

Accordingly, in the image display apparatus according to the aspect of the invention, the adjusting portion according to the user's intention can be accurately selected from the projected image.

In the aforementioned image display apparatus, the pixel selection portion has a size capable of selecting a total of nine pixels in a square shape where three consecutive pixels are arrayed in each of vertical and horizontal directions.

According to such a construction, the pixel selection portion has a size capable of selecting a total of nine pixels in a square shape where the three consecutive pixels are arrayed in each of the vertical and horizontal directions. Therefore, although the average value is obtained from the grayscale values excluding the pixels having the maximum and minimum grayscale values, the effective pixel data for the seven pixels can be obtained. In addition, since the pixel selection portion has a suitable size over the entire image, it can be easily visually perceived. In addition, since the pixel selection portion has a square shape, the image portion can be easily selected.

Accordingly, in the image display apparatus according to the aspect of the invention, the adjusting portion according to the user's intention can be easily and accurately selected from the projected image.

In the aforementioned image display apparatus, the selection cursor further includes an annular portion which is disposed along a circumference of the pixel selection portion to have a shape which is one-step larger than an outer portion of the pixel selection portion, wherein a relative position of the annular portion to the pixel selection portion is always maintained constant, and the annular portion together with the pixel selection portion is moved on the still image.

According to such a construction, the selection cursor further includes the annular portion which is disposed along the circumference of the pixel selection portion to have a shape which is one-step larger than an outer portion of the pixel selection portion. In addition, a relative position of the annular portion to the pixel selection portion is always maintained constant, and the annular portion together with the pixel selection portion is moved on the still image. Therefore, the selection cursor has a specific shape having the annular portion of which size is larger by one step than that of the pixel selection portion, and a large selection cursor can be distinctively displayed on the image.

Accordingly, due to the distinctively displayed selection cursor, a desired image portion can be easily selected.

Accordingly, in the image display apparatus according to the aspect of the invention, due to the selection cursor distinctively displayed on the image, a desired image portion can be easily selected.

In the aforementioned image display apparatus, in the selection manipulation for the image portion by using the selection cursor, a position of the pixel selection portion is controlled by the image signal processing unit so that the entire portions of the pixel selection portion are not protruded from the still image, and wherein, when the pixel selection portion reaches an edge of the still image, the selection cursor is displayed in a state that a portion of the image corresponding to the annular portion protruding from the still image is excluded.

According to such a construction, the position of the pixel selection portion is controlled by the image signal processing unit so that the entire portions of the pixel selection portion are not protruded from the still image, and when the pixel selection portion reaches the edge of the still image, the selection cursor is displayed in a state that a portion of the image corresponding to the annular portion protruding from the still image is excluded. Therefore, due to the selection cursor, the image portion to the edge of the image can be selected from the image, and although the edge of the image is selected, the selection cursor can be visually perceived.

Accordingly, in the image display apparatus according to the aspect of the invention, due to the selection cursor, the desired image portion can be selected from all the effective image regions.

In the aforementioned image display apparatus, a color tone of the selection cursor is set to one of white and black, and wherein the OSD unit adjusts the color tone of the selection cursor based on a color tone having high contrast among a color tone of the image portion selected by the selection cursor and a color tone of one of black and white.

According to such a construction, the OSD unit adjusts the color tone of the selection cursor based on a color tone having high contrast among a color tone of the image portion selected by the selection cursor and a color tone of one of black and white. The color tone of the selection cursor is adjusted so as to be an easily visually perceived color tone.

Accordingly, due to the distinctively displayed selection cursor, a desired image portion can be easily selected.

Accordingly, in the image display apparatus according to the aspect of the invention, due to the selection cursor distinctively displayed on the image, a desired image portion can be easily selected.

According to further still another aspect of the invention, there is provided an image display apparatus for displaying an image represented by an image signal on a display unit, comprising: an OSD unit which displays a selection cursor used to select a desired image portion on the image; a manipulator which is used to perform at least a manipulation of starting adjusting of the grayscale characteristic of the image and a selection manipulation of selecting the image portion by using the selection cursor; and an image signal processing unit which stops the image and allows the OSD unit to display the selection cursor when image adjusting including the grayscale characteristic adjusting is performed on the image signal and a manipulation of performing the image adjusting is performed, wherein, when the image portion is selected from the still image by the selection cursor, the image signal processing unit blinks the selected image portion and an image portion having a grayscale substantially equal to that of the selected image portion in the still image.

According to such a construction, when the manipulation for the image adjusting is performed, the image signal processing unit stops the image and displays the selection cursor for selecting the desired image portion on the image on the display unit. Even in case of a moving image where the image portion is not easy to select due to a change of the image, since the image is stopped, the image portion can be easily selected. In addition, the desired image portion can be selected from the still image by using the selection cursor.

In addition, when the image portion is selected from the still image by the selection cursor, the image signal processing unit blinks the selected image portion of the still image and the image portion having a grayscale substantially equal to that of the selected image portion. Therefore, these image portions are displayed so as to be distinguished from other image portions. Therefore, the selected image portion can be distinctively visually perceived. In addition, even in a case where unexpected portion is selected, the portion can be identified at a glance.

Accordingly, in the image display apparatus according to the aspect of the invention, a desired image adjusting portion can be selected from the displayed image, so that the selected image portion can be distinctively visually perceived.

In the aforementioned image display apparatus, the blinking of the image portion selected by the selection cursor and the image portion having a grayscale substantially equal to that of the selected image portion is performed by periodically increasing and decreasing the output grayscale value at the adjusting point having the input grayscale level closest to the grayscale value of the selected image portion among a plurality of the adjusting points corresponding to the input grayscale level in the grayscale characteristic of the image signal representing the still image.

According to such a construction, the blinking of the image portion selected by the selection cursor and the image portion having a grayscale substantially equal to that of the selected image portion is performed by periodically increasing and decreasing the output grayscale value at the adjusting point having the input grayscale level closest to the grayscale value of the selected image portion among a plurality of the adjusting points corresponding to the input grayscale level in the grayscale characteristic of the image signal representing the still image. Therefore, the selected image portion and the image portion having a grayscale substantially equal to that of the selected image portion can be blinked by using such a simple method of increasing and decreasing the output grayscale value at the one adjusting point.

Accordingly, in the image display apparatus according to the aspect of the invention, the selected image portion and the image portion selected together with the selected image portion can be visually perceived and identified by using such a simple method.

In the aforementioned image display apparatus, the image signal processing unit includes a gamma correcting unit which corrects one reference grayscale characteristic among a plurality of the reference grayscale characteristics defined in advance in order to match the grayscale characteristics unique to the display unit with a visual characteristic of a human and a grayscale point adjusting unit which adjusts the output grayscale value for a plurality of the adjusting points disposed according to the input levels in the reference grayscale characteristic, wherein grayscale adjusting for the image signal in the image signal processing unit is performed based on a grayscale characteristic obtained by combining grayscale correction in the gamma correcting unit and grayscale adjusting in the grayscale point adjusting unit, and wherein the blinking of the selected image portion selected by the selection cursor and an image portion having a grayscale substantially equal to that of the selected image portion is performed by the grayscale point adjusting unit.

According to such a construction, the image signal processing unit includes a gamma correcting unit which corrects one reference grayscale characteristic among a plurality of the reference grayscale characteristics defined in advance in order to match the grayscale characteristics unique to the display unit with a visual characteristic of a human and a grayscale point adjusting unit which adjusts the output grayscale value for a plurality of the adjusting points disposed according to the input levels in the reference grayscale characteristic. The functions are performed by individual dedicated units. Therefore, since the dedicated constructions can be formed, it is possible to simplify the constructions.

In addition, the blinking of the selected image portion selected by the selection cursor and an image portion having a grayscale substantially equal to that of the selected image portion is performed by the grayscale point adjusting unit. Therefore, the image portion can be blinked without influence to the reference grayscale characteristic.

Accordingly, in the image display apparatus according to the aspect of the invention, the selected image portion and the image portion selected together with the selected image portion can be visually perceived and identified by using such a simple construction.

In the aforementioned image display apparatus, increment and decrement amounts of the output grayscale value which is periodically increased and decreased at the adjusting point are ±10% or less of the full scale of the output grayscale value in the grayscale characteristic.

An output grayscale value of a general image display apparatus is displayed with 8 to 10 bits, so that 256 to 1024 output grayscale values are generated. When a portion of the screen is visualized by the blinking of the image portion, if the blinking level is periodically increased and decreased from the "zero" level to "maximum" level according to the full scale of the output grayscale level, since the contrast is too high, the image is flickered, so that observer's eyes become fatigued. In addition, since the response of the display unit cannot be caught up with, an inharmonious image may be formed.

According to such a construction, the increment and decrement amounts of the output grayscale value which is periodically increased and decreased at the adjusting point are ±10% or less of the full scale of the output grayscale value in the grayscale characteristic. Therefore, due to such a suitable contrast, the image portion can be visually perceived without the fatigue of the observer's eyes. In addition, the response of the display unit can be sufficiently caught up with.

Accordingly, in the image display apparatus according to the aspect of the invention, the selected image portion can be distinctively visually perceived without unpleasant feeling.

In the aforementioned image display apparatus, a blinking period of the selected image portion selected by the selection cursor and the image portion having a grayscale substantially equal to that of the selection image portion is in a range of from 0.5 Hz to 3 Hz.

In general, with respect to the visual characteristic of a human, it is known that, if the blinking period exceeds 3 Hz, unpleasant feeling caused from the flickering of the image is increased.

According to such a construction, the blinking period of the selected image portion selected by the selection cursor and the image portion having a grayscale substantially equal to that of the selection image portion is in a range of from 0.5 Hz to 3 Hz. Therefore, unpleasant feeling caused from the flicker can be prevented, and the image portion can be distinctively visually perceived.

Accordingly, in the image display apparatus according to the aspect of the invention, the selected image portion can be distinctively visually perceived without unpleasant feeling.

In the aforementioned image display apparatus, the OSD unit may overlap a graph adjusting screen including a graph representing a grayscale characteristic of the image and smaller than the image with the image signal and blink a dot displayed portion corresponding to the selected image portion among a plurality of the dot displayed portions representing output grayscale levels at a plurality of adjusting points disposed according to input grayscale levels used to adjust the grayscale characteristic in the graph adjusting screen or change a color tone of the dot displayed portion.

According to such a construction, the OSD unit overlaps the graph adjusting screen with the image signal and blinks the dot displayed portion corresponding to the selected image portion among a plurality of the dot displayed portions representing output grayscale levels at a plurality of adjusting points disposed according to input grayscale levels used to adjust the grayscale characteristic in the graph adjusting screen or changes a color tone of the dot displayed portion. Therefore, a current grayscale characteristic can be visually perceived by using the graph, and a selected portion of the graph can be distinctively understood.

Accordingly, in the image display apparatus according to the aspect of the invention, a current grayscale characteristic can be visually perceived by using the graph, and a selected portion of the graph can be distinctively understood.

In the aforementioned image display apparatus, the OSD unit overlaps a characteristic identification screen which is a graph representing a grayscale characteristic of the image and smaller than the image with the image signal and blinks a dot displayed portion corresponding to the selected image portion among a plurality of the dot displayed portions representing output grayscale levels at a plurality of adjusting points disposed according to input grayscale levels of the grayscale characteristic in the characteristic identification screen or changes a color tone of the dot displayed portion.

According to such a construction, the OSD unit overlaps a characteristic identification screen which is a graph representing a grayscale characteristic of the image and smaller than the image with the image signal and blinks a dot displayed portion corresponding to the selected image portion among a plurality of the dot displayed portions representing output grayscale levels at a plurality of adjusting points disposed according to input grayscale levels of the grayscale characteristic in the characteristic identification screen or changes a color tone of the dot displayed portion. Therefore, a current grayscale characteristic can be visually perceived by using the graph, and a selected portion of the graph can be distinctively understood.

Accordingly, in the image display apparatus according to the aspect of the invention, a current grayscale characteristic can be visually perceived by using the graph, and a selected portion of the graph can be distinctively understood.

In the aforementioned image display apparatus, a blinking period of the dot displayed portion in the graph adjusting screen or the characteristic identification screen is in synchronization with a blinking period of the selected image portion selected by the selection cursor.

According to such a construction, a blinking period of the dot displayed portion in the graph adjusting screen or the characteristic identification screen is in synchronization with a blinking period of the selected image portion selected by the selection cursor. Therefore, it can be visually perceived that the selected image portion and the dot displayed portion at the adjusting point corresponding to the characteristic identification screen are equal to each other. In addition, the periods are synchronized with each other, so that the visually unpleasant feeling can be prevented.

Accordingly, in the image display apparatus according to the aspect of the invention, it can be visually represented that the selected image portion corresponds to the dot displayed portion.

In the aforementioned image display apparatus, a plurality of the adjusting points are distributed so that a half or more of a total number of the adjusting points are distributed to a range of from a low grayscale to an intermediate grayscale in the input grayscale level.

Human eyes are sensitive to a dark color. In addition, the adjusting in the high grayscale range in the grayscale characteristic may be performed by "brightness" adjusting, that is, gain adjusting which is provided to a general image display apparatus.

According to such a construction, a plurality of the adjusting points are distributed so that a larger number of the adjusting points are distributed to a range of from the low grayscale value to the intermediate grayscale value at the input side. Therefore, in the image display apparatus, a large number of the adjusting points are provided to the grayscale range needed to improve the "image quality" which the user highly expects in the grayscale adjusting.

Accordingly, in the image display apparatus according to the aspect of the invention, the image adjusting according to the user's preferences can be performed.

In the aforementioned image display apparatus, a predetermined output grayscale amount defined for each of the selected adjusting points is defined as one step, and the graph adjusting screen includes plus and minus buttons used to increase and decrease the grayscale value step by step, and wherein the predetermined output grayscale amount is set so that a larger amount is provided to the adjusting points in a low grayscale range than the adjusting points in a high grayscale range.

In general, in such image adjusting as grayscale adjusting, the frequency and amount of adjusting in the high grayscale range are small, but the frequency and amount of adjusting in the low grayscale range are large.

According to such a construction, predetermined output grayscale amounts are so set that a larger amount is provided to the adjusting points in the low grayscale range than the adjusting points in the high grayscale range. The adjusting amount per one step in the graph adjusting screen is set to the adjusting amounts satisfying the needed usage.

Accordingly, the image display apparatus according to the aspect of the invention can be conveniently used.

In the aforementioned image display apparatus, when a manipulation of deciding the adjusting point selected in the characteristic identification screen by using the manipulator is performed, the OSD unit stops the overlapping of the characteristic identification screen and overlaps a grayscale adjusting screen used to adjust an output grayscale level of the selected adjusting point with the image signal, wherein a predetermined output grayscale amount defined for each of the selected adjusting points is defined as one step, and the grayscale adjusting screen includes plus and minus buttons used to increase and decrease the grayscale value step by step, and wherein the predetermined output grayscale amount is set so that a larger amount is provided to the adjusting points in a low grayscale range than the adjusting points in a high grayscale range.

According to such a construction, predetermined output grayscale amounts are so set that a larger amount is provided to the adjusting points in the low grayscale range than the adjusting points in the high grayscale range. The adjusting amount per one step in the grayscale adjusting screen is set to the adjusting amounts satisfying the needed usage.

Accordingly, the image display apparatus according to the aspect of the invention can be conveniently used.

According to further still another aspect of the invention, there is provided an image adjusting method for an image display apparatus including a display unit which displays an image represented by an image signal, a storage unit which stores a plurality of grayscale characteristics used to adjust a grayscale characteristic in the image signal, an OSD unit which overlaps a selection screen which is used to select one of a plurality of the grayscale characteristics and smaller than the image with the image signal, a manipulator which is used to perform at least a manipulation of selecting one of the grayscale characteristics from the selection screen and a manipulation of deciding selection contents, and an image signal processing unit which performs an image process including adjusting of the grayscale characteristic on the image signal, the image adjusting method comprising: when a manipulation of selecting the grayscale characteristic is performed in the selection screen, adjusting the grayscale characteristic of the image signal based on the selected grayscale characteristic; displaying the image on the display unit according to the image signal which is subjected to the adjusting.

The aforementioned image adjusting method comprise: when a manipulation of selecting the grayscale characteristic is performed in the selection screen, adjusting the grayscale characteristic of the image signal based on the selected grayscale characteristic; displaying the image on the display unit according to the image signal which is subjected to the adjusting. Therefore, in a step of selecting the adjusted contents, it is possible to identify the image including the adjusted contents in a background of the selection screen.

Accordingly, in the image adjusting method for the image display apparatus according to the aspect of the invention, it is possible to identify the image including the adjusted contents in the step of selecting the adjusted contents.

According to further still another aspect of the invention, there is provided an image adjusting method for an image display apparatus including a display unit which displays an image represented by an image signal, an OSD unit which overlaps a selection cursor used to select a desired image portion of the image, a characteristic identification screen including a graph representing a correlation between input and output grayscale levels of a grayscale characteristic at an initial setting of the image, and a grayscale adjusting screen used to adjust grayscales of a plurality of adjusting points in the grayscale characteristic of the image with the image signal, a manipulator which is used to perform at least a manipulation of starting adjusting of the grayscale characteristic of the image, a selection manipulation of selecting the image portion by using the selection cursor, and a manipulation of deciding the selected image portion, and an image signal processing unit which performs an image process including adjusting of the grayscale characteristic on the image signal, the image adjusting method comprising: when a manipulation of performing the image adjusting is performed, stopping the image and displaying the selection cursor on the display unit; when a manipulation of selecting the image portion by using the selection cursor is performed, overlapping the characteristic identification screen where the adjusting point corresponding to a grayscale of the selected image portion is blinked or a color tone of the adjusting point is changed with the image signal; and when a manipulation of deciding the selected image portion is performed, overlapping the grayscale adjusting screen of the adjusting point corresponding to a grayscale of the selected image portion with the image signal.

In the aforementioned image adjusting method, when the manipulation for the image adjusting is performed, the image is stopped, and the selection cursor is displayed on the image. Even in case of a moving image where the image portion is not easy to select due to a change of the image, since the image is stopped, so that the image portion can be easily selected. In addition, the desired image portion can be selected from the still image by using the selection cursor.

When the manipulation of selecting the image portion by using the selection cursor is performed, the adjusting point corresponding to the grayscale of the selected image portion is blinked, or the characteristic identification screen where the color tone of the adjusting point is changed is overlapped with the image signal. The position of the image portion in the grayscale characteristic of the entire image is distinctively represented on the graph. Accordingly, the adjusting point in the grayscale characteristic of the entire image can be identified by using the graph before the grayscale adjusting is performed.

In addition, when the manipulation of deciding the selected image portion is performed, the grayscale adjusting screen at the adjusting point corresponding to the grayscale of the selected image portion is overlapped with the image signal. Therefore, due to the grayscale adjusting screen, the grayscale adjusting of the selected image portion can be performed.

Accordingly, in the image adjusting method for the image display apparatus according to the aspect of the invention, the desired adjusting portion can be selected from the displayed image, and the image adjusting for the selected adjusting portion can be performed after the grayscale characteristic of the entire image is identified.

According to further still another aspect of the invention, there is provided an image adjusting method for an image display apparatus including a display unit which displays an image represented by an image signal, an OSD unit which overlaps a selection cursor which is used to select a desired image portion on the image with the image signal, a manipulator which is used to perform at least a manipulation of starting adjusting of the grayscale characteristic of the image and a selection manipulation of selecting the image portion by using the selection cursor, and an image signal processing unit which stops the image and allows the OSD unit to display the selection cursor when image adjusting including the grayscale characteristic adjusting is performed on the image signal and a manipulation of performing the image adjusting is performed, the image adjusting method comprising: receiving a manipulation which is used to select the image portion in the still image by using the selection cursor; and blinking the selected image portion and an image portion having a grayscale substantially equal to that of the selected image portion in the still image.

The aforementioned image adjusting method comprises: receiving a manipulation which is used to select the image portion in the still image by using the selection cursor; and blinking the selected image portion and an image portion having a grayscale substantially equal to that of the selected image portion in the still image. Therefore, these image portions are displayed so as to be distinguished from other image portions. Therefore, the selected image portion can be distinctively visually perceived. In addition, even in a case where unexpected portion is selected, the portion can be identified at a glance.

Accordingly, in the image adjusting method for the image display apparatus according to the aspect of the invention, a desired image adjusting portion can be selected from the displayed image, so that the selected image portion can be distinctively visually perceived.

In a case where the image adjusting method for the aforementioned image display apparatus is carried out in a computer provided to the image display apparatus, the invention may be implemented with a program for executing the functions of the image display apparatus or a computer-readable recording medium where the program is recorded. As a recording medium, there are a flexible disk, a CD-ROM, an optical magnetic disk, an IC-card, a ROM cartridge, a punch card, a printed material having printed symbols such as barcodes, an internal storage device (RAM, ROM, or other memories) of an image display apparatus, an external storage device, or other computer-readable media.

BRIEF DESCRIPTION OF THE DRAWINGS

The invention will be described with reference to the accompanying drawings, wherein like numbers reference like elements.

FIG. 3A is a view an example of an input output characteristic of a grayscale point adjusting unit, and FIG. 3B is a table showing a grayscale amount per one step at each adjusting point.

FIG. 12 is a flowchart for explaining operations of customizing a grayscale characteristic in a graph adjusting mode.

FIG. 16 is a flowchart for explaining operations of customizing a grayscale characteristic in a cursor adjusting mode.

DESCRIPTION OF EXEMPLARY EMBODIMENTS

Hereinafter, embodiments of the invention are described in detail with reference to the accompanying drawings.

First Embodiment

Overviews of Projector

Figure 1:
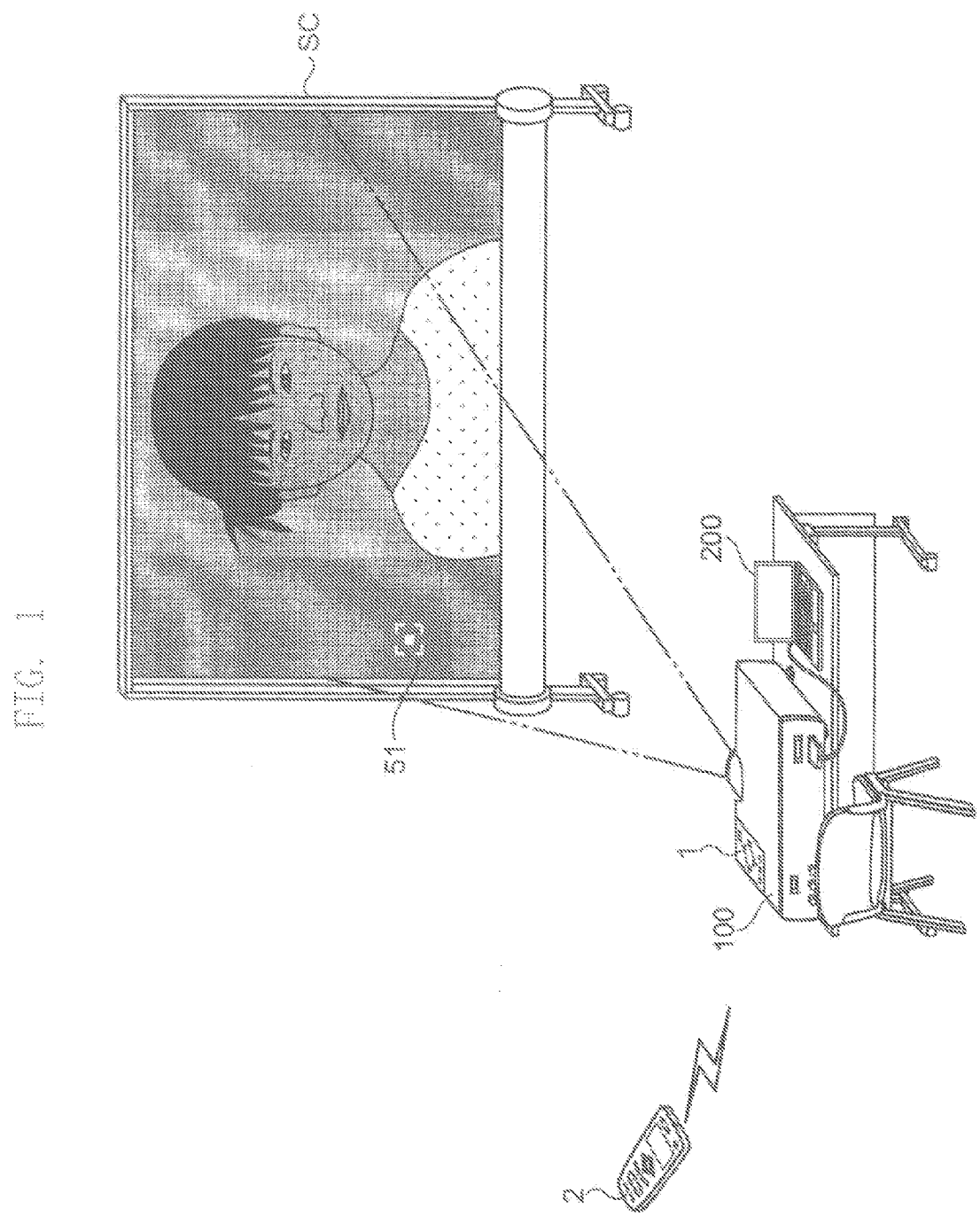
FIG. 1 is a view showing a usage of a projector according to a first embodiment of the invention.

FIG. 1 is a view showing a usage of a projector according to a first embodiment of the invention. The projector 100 as an image display apparatus projects an image on a screen SC based on image signals supplied from an image signal supply unit 200 such as a personal computer.

In order to increase image representing performance according to image contents or projection configuration, the projector 100 has two image adjusting functions and can adjust a grayscale value included in the image signal supplied from the image signal supply unit 200. The one of the image adjusting functions of the projector 100 is a "gamma" adjusting function for selecting a reference γ characteristic, that is, a basic grayscale characteristic among a plurality of selection items stored in advance. The other is a "color mode" adjusting function for selecting a desired color mode among a plurality of selection items such as "natural", "dynamic", and "theater" in order to allocate a characteristic accent to the reference γ characteristic.

"Custom" characteristic is included in the reference γ characteristic. At a time of performing "gamma" adjusting, when the "custom" characteristic is selected, a mode proceeds. In the mode, a grayscale characteristic", that is, an output grayscale value with respect to an input grayscale value can be customized with respect to each of a plurality of specific input grayscale values (hereinafter, referred to as adjusting points). Namely, in the "custom" characteristic, the reference γ characteristic, that is, the grayscale characteristic which is a correlation between the input and output grayscale values can be customized.

In order to designate a to-be-customized adjusting point, the projector 100 has a function of selecting a desired image portion in a projected image and can adjust the output grayscale value of an adjusting point corresponding to the grayscale value of the selected image portion.

For example, in FIG. 1, a lower left image portion of a projected image projected on the screen SC is selected by a selection cursor 51 for selecting an image portion. In this state, when a manipulation of deciding the selected image portion is performed, the projector 100 can adjust an output grayscale value of an image portion having a grayscale substantially equal to that of the selected image portion.

In addition to the "cursor" adjusting mode where adjusting starts from selecting a desired image portion by using the aforementioned selection cursor 51, the "gamma" adjusting function has a "graph" adjusting mode where the grayscale adjusting is performed by displaying a graph representing grayscale characteristics over the entire grayscale range and selecting a to-be-adjusted adjusting point among a plurality of the adjusting points included in the graph. In the "graph" adjusting mode, an output grayscale value corresponding to the selected adjusting point can be adjusted.

The selection of these functions and adjusting modes and the manipulation of the projector 100 including the adjusting manipulation are performed by a manipulator 1 disposed on a top of the projector 100 mounted on a table or a remote controller 2.

The projector 100 is not limited to one mounted on a table. Alternatively, the projector 100 may be disposed on a ceiling and manipulated by the remote controller 2.

Construction of Projector

Figure 2:
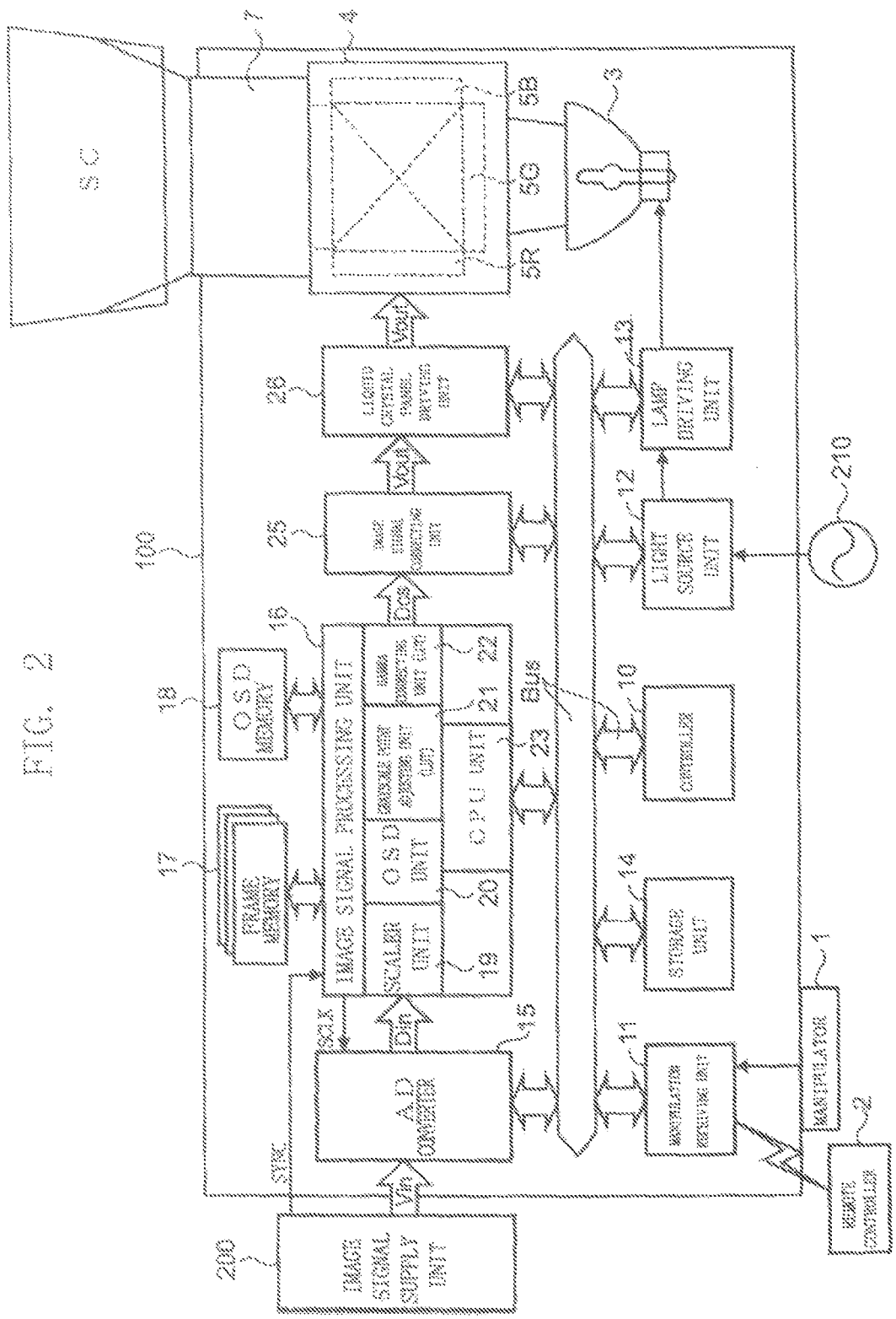
FIG. 2 is a schematic view showing a construction of the projector.

FIG. 2 is a schematic view showing construction of the projector according to the embodiment of the invention. A schematic construction of the projector 100 for implementing the image adjusting functions such as "gamma" adjusting is described with reference to FIG. 2.

The projector 100 is a so-called "three-plate type liquid crystal projector" which extracts three primary light components such as red, green, and blue light components from light radiated by a lamp 3 as a light source unit, modulating the color components by using liquid crystal light valves 5R, 5G, and 5B as display units corresponding the respective colors light in accordance with the image signals, and magnifying and projecting a modulated full color light (recombined light) by using a projection lens 7 on the screen SC. The liquid crystal light valves 5R, 5G, and 5B are optical modulation devices corresponding to red, green, and blue light and constitute an optic system 4.

The projector 100 includes the manipulator 1, the remote controller 2, the lamp 3, the optic system 4, the projection lens 7, a controller 10, a manipulation receiving unit 11, a power supply unit 12, a lamp driving unit 13, a storage unit 14, an AD converter 15, an image signal processing unit 16, an image signal correcting unit 25, a liquid crystal panel driving unit 26, and the like.

The manipulator 1 has a plurality of manipulation buttons for manipulating the projector 100. A plurality of the manipulation buttons includes a "Power Supply" button for starting or shutting down the projector 100, a "Menu" button for displaying various manipulation menus (manipulation screen), a "Select" button for deciding a selected content, an "Esc" button for returning to a one-screen-before manipulation screen, and "↑", "↓" "→" and "←" buttons for selecting the selection items or performing one-step increment or decrement. In addition, "↑" and "↓" buttons are described as a set of "up" and "down" buttons, and "→" and "←" buttons are described as a set of "left" and "right" buttons. The "up" and "down" buttons and the "left" and "right" buttons functions plus and minus buttons according to types of manipulation screens, respectively.

The remote controller 2 is a device for manipulating the projector 100 in a remote manner and includes a "γ adjusting" button for commanding the "gamma" adjusting as well as a plurality of the manipulation buttons same as those of the manipulator 1.

The lamp 3 may be a high pressure mercury lamp, a metal halide lamp, a halogen lamp, or other discharging lamps capable of obtaining high luminescence.

The optic system 4 includes an integrated optic system (not shown) for modulating light radiated from the lamp 3 into light having a stabilized luminescence distribution, an extraction optic system (not shown) for extracting primary color components of red, green, and blue from the light having a stabilized luminescence distribution and supplying the color components the liquid crystal light valves 5R, 5G, and 5B corresponding to the colors, and a recombination optic system (not shown) for recombining the modulated color components according to the image signals corresponding to the colors in the liquid crystal light valves.

The projection lens 7 magnifies the modulated full color light emitted from the optic system 4 and projects a full color image on the screen SC.

The controller 10 is a CPU (Central Processing Unit) and communicates signals through a bus line Bus with other units.

When manipulation is performed by the manipulator 1 or the remote controller 2, the manipulation receiving unit 11 receives the associated manipulation and transmits manipulation signals as triggers for various operations to the controller 10.

The power supply unit 12 transforms, rectifies, and smoothes an AC power supplied from an external power supply 210 in a built-in AC/DC converter (not shown) and supplies a stabilized DC voltage to units of the projector 100.

The lamp driving unit 13 includes an igniter circuit (not shown) which is supplied with a power from the power supply unit 12 and generates a high voltage to form a discharge path in order to ignite the lamp 3 and a ballast circuit which maintains a stabilized ignition state after the ignition.

The storage unit 14 is constructed with, for example, flash memories, FeRAMs (Ferroelectric Random Access Memory), or other data-rewritable non-volatile memories. The storage unit 14 stores an starting program which defines procedures and contents for starting the projector 100, a "grayscale characteristic adjusting program" for correcting the grayscale values of the image signals according to preference, other programs for controlling the operations of the projector 100, and associated data. The associated data include a plurality of γ correction data corresponding to VT characteristics representing a correlation between input voltage levels and transmittance of light measured with respect to the liquid crystal light valves 5R, 5G, and 5B in a production stage of the projector 100.

The AC converter 15 is an AC converter including a decoder (not shown). The AD converter 15 matches various formats of analog image signals Vin supplied from the image signal supply unit 200 with a signal type in a decoder as needed, performs AD conversion based on a sampling clock SCLK, and outputs converted digital RGB signals as image signals Din. The sampling clock SCLK is generated based on a synchronization signal SYNC included in the image signals Vin in a PLL (Phase Locked Loop) circuit of the image signal processing unit 16 and supplied to the AD converter 15. The AD conversion of the image signals is performed in order to perform various image signal processes with the image signals Vin.

The image signal processing unit 16 is an image process having a scaler function and the like and generates digital image signals Dcs by performing various image processes such as scaling of the image signals Din and adjusting of the grayscale values. The image signal processing unit 16 is provided with a frame memory 17 and an OSD memory 18.

The frame memory 17 is constructed with, for example, DRAMs (Dynamic Random Access Memories), and it is a three-layered memory plane which stores image data corresponding to image signals with respect to red, green, and blue colored light.

The OSD memory 18 is an image memory which stores OSD image data representing OSD images such as various manipulation screens and a selection cursor which are displayed so as to be overlapped with the projected image.

The image signal processing unit 16 includes scaler unit 19, an OSD unit 20, a grayscale point adjusting unit 21, a gamma correcting unit 22, a CPU unit 23, and the like.

The scaler unit 19 records the image data in accordance with the image signals Din in the frame memory 17 with respect to the RGB color signals with resolutions of the image signals and performs a scaling process of converting and reading out the image data with resolutions which the liquid crystal light valves 5R, 5G, and 5B can display with and generating image signals matching with a resolution of a display unit. In addition, a trapezoid correction process for approximating a shape of an effective image projected on the screen SC to a rectangular shape is performed together with the scaling process.

The OSD unit 20 performs an OSD (On Screen Display) process for overlapping the OSD images such as a manipulation screen on the projected image. The OSD process is performed in a step where the image data corresponding to the RGB colored light is recorded in the frame memory 17, and the OSD unit 20 reads out the OSD image data representing the manipulation screen or the like from the OSD memory 18 and overlaps the read-out OSD image data in the frame memory 17.

The grayscale point adjusting unit 21 and the gamma correcting unit 22 are one-dimensional lookup tables (hereinafter, referred to as a "LUT") disposed in an RAM area of firmware and adjusts the grayscale values included in the image signals Din. In addition, a front stage of the grayscale point adjusting unit 21 is provided with an "RGB-YUV" converter (not shown) which converts the RGB signals into YUV signals, and a rear stage of the gamma correcting unit 22 is provided with a "YUV-RGB" converter (not shown) which converts the YUV signals into the "RGB signals. In the grayscale point adjusting unit 21 and the gamma correcting unit 22, adjusting is performed by using the Y signal of the YUV signals.

The CPU unit 23 is a CPU which controls the image signal processing unit 16 as an image processor and controls a series of the aforementioned image processes by using the frame memory 17 and the OSD memory 18. Alternatively, the CPU unit 23 also has the functions of the controller 10 such as starting of the projector 100, projecting of the image, shutting down, or whole controlling. In such a construction, the controller 10 may be omitted.

The image signal correcting unit 25 is a three-dimensional LUT and generates digital image signals by performing a color matching process for suitably representing the image with the image signals in a color reproducing region (GAMUT) which the liquid crystal light valves 5R, 5G, and 5B can display with respect to the image signals Dcs input from the image signal processing unit 16 or a color irregularity correction process for correcting a color irregularity unique to the liquid crystal light valves 5R, 5G, and 5B. The image signal correcting unit 25 includes a DA converter (not shown) and generates analog image signals Vout by performing DA conversion on the digital image signals in the DA converter.

The liquid crystal panel driving unit 26 supplies the image signals Vout input from the image signal correcting unit 25 and driving voltages with respect to the liquid crystal light valves 5R, 5G, and 5B and irradiates the liquid crystal light valves 5R, 5G, and 5B with the image.

Image Signal Adjusting and Correcting Methods

Figure 4A:
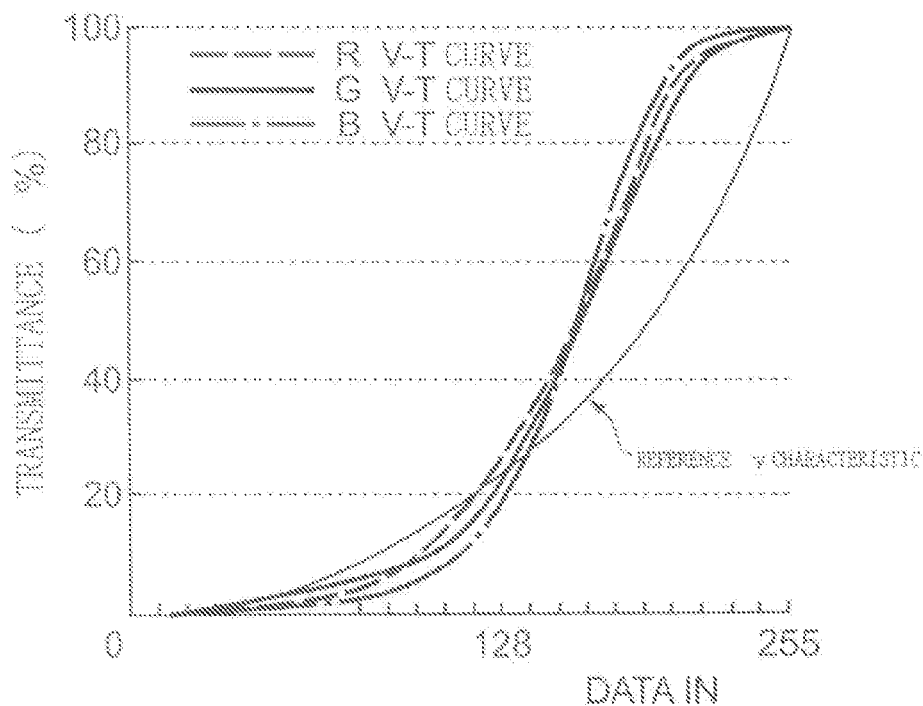
FIG. 4A is a graph showing an example of a VT characteristic of a liquid crystal light valve.
Figure 4B:
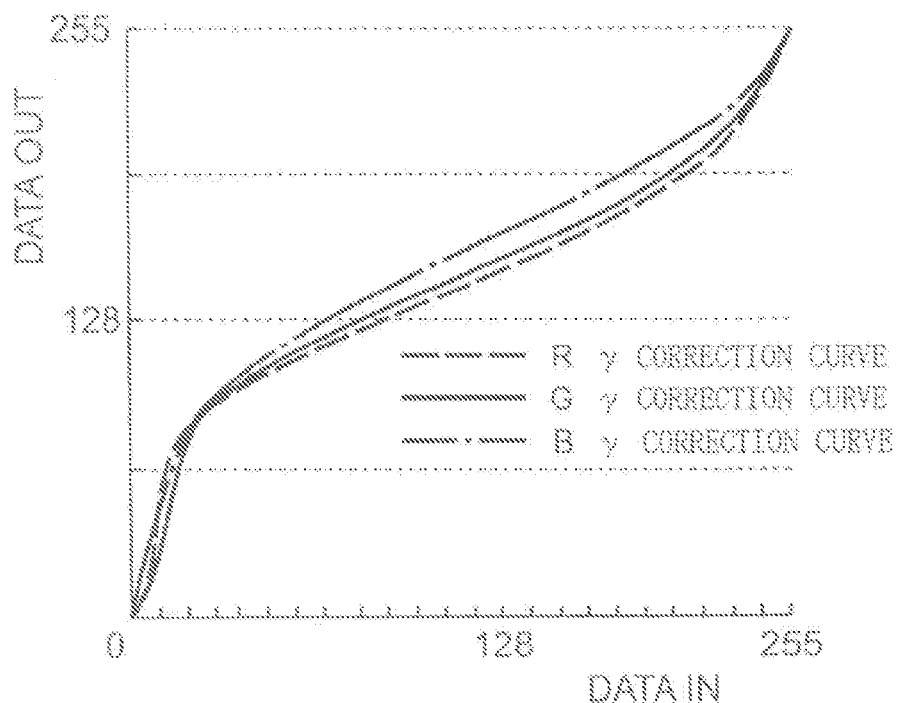
FIG. 4B is a graph showing an example of an input output characteristic of a gamma correcting unit.

FIG. 3A is a graph showing an example of input output characteristics in the LUT of the grayscale point adjusting unit 21. FIG. 4A is a graph showing an example of a VT characteristic of a liquid crystal light valve, and FIG. 4B is a graph showing an example of an input output characteristic of an LUT of the gamma correcting unit 22.

The image signal adjusting of the grayscale point adjusting unit 21 and the image signal adjusting of the gamma correcting unit 22 as characterized portions of the embodiment of the invention are described with reference to FIGS. 2, 3A, 4A, and 4B.

In the projector 100, the image signal adjusting is divided into the adjusting of the grayscale point adjusting unit 21 as a first step and the adjusting of the gamma correcting unit 22 as a second step. Therefore, the image signals Dcs output from the image signal processing unit 16 are subjected to a combination of the adjusting of the first and second steps.

The first step is grayscale adjusting for each adjusting point in the grayscale point adjusting unit 21. The grayscale point adjusting unit 21 performs "color mode" adjusting and "custom" characteristic adjusting in "gamma" adjusting.

An X axis of the graph shown in FIG. 3A is provided with a plurality of adjusting points "grayscale 1 to 9" corresponding to specific input grayscale values. In addition, dot display portions D1 to D9 representing output grayscale values at the adjusting points "grayscale 1 to 9" are provided. The larger the grayscale value is, the brighter image is represented.

The LUT of the grayscale point adjusting unit 21 having the input output characteristic of graph shown in FIG. 3A outputs 10-bit output grayscale values in one-to-one correspondence with the 10-bit input gray values. In an initial setting of the LUT, a conversion characteristic is set to "y=x" when the X-axis input grayscale value and the Y-axis output grayscale value are denoted by "X" and "Y". The setting corresponds to a γ value of 1.0 which is "natural" in terms of a color mode in the "color mode" adjusting.

The "grayscale correction data" defining the output grayscale values of the adjusting points "grayscale 1 to 9" are stored in the storage unit 14 for each color mode, and the "grayscale correction data" of the selected color mode is set to the LUT of the grayscale point adjusting unit 21.

In addition, in the "custom" characteristic adjusting of the "gamma" adjusting, the output grayscale values of the adjusting points "grayscale 1 to 9" can be changed into desired values, and the customized "grayscale correction data" is set to the LUT of the grayscale point adjusting unit 21.

In addition, although the "custom" characteristic adjusting is performed in the grayscale point adjusting unit 21, the adjusting manipulation is performed not in a manipulation screen where a selection manipulation of the color mode is performed but in a manipulation screen of the "gamma" adjusting.

The second step is adjusting for correcting grayscale characteristics unique to the liquid crystal light valves 5R, 5G, and 5B in the gamma correcting unit 22. In the later description, the image signal adjusting of the grayscale point adjusting unit 21 is referred to as "grayscale point adjusting", and the adjusting for correcting the grayscale characteristics unique to the liquid crystal light valves in the gamma correcting unit 22 is referred to as "γ correction".

In the graph shown in FIG. 4A, the vertical axis is represented in units of 8 bit by voltages applied to the liquid crystal light valves, and the horizontal axis is represented by transmittance of light. As shown in FIG. 4A, the liquid crystal light valves 5R, 5G, and 5B have unique grayscale characteristics (referred to as voltage-to-transmittance characteristics, that is, VT characteristics).

The gamma correcting unit 22 performs correcting in the LUT so that the grayscale characteristics unique to the liquid crystal light valves 5R, 5G, and 5B become the input output characteristics represented as the reference γ characteristic in the graph shown in FIG. 4A. For the reason, the LUTs provided to the liquid crystal light valves 5R, 5G, and 5B of the gamma correcting unit 22 is set to "γ correction data" having the input output characteristic for converting the grayscale characteristics unique to the liquid crystal light valves 5R, 5G, and 5B in to the reference γ characteristic (for example, a γ value of 2.2) as shown in FIG. 4B.

The projector 100 has five selection items of γ values in a range of from 2.0 to 2.4 (0.1 interval) as the reference γ characteristic. In the production step for the projector 100, after the grayscale characteristics of the liquid crystal light valves 5R, 5G, and 5B are measured, the γ correction data corresponding to the reference γ characteristic are set in advance and stored in the storage unit 14.

Since the image signal adjusting of the projector 100 includes the "grayscale point adjusting" of the grayscale point adjusting unit 21 as the first step and the "γ correction" of the gamma correcting unit 22 as the second step, the image signal Dcs output from the image signal processing unit 16 has a grayscale value obtained by combining the adjusted contents of the first and second steps. In terms of a graph, the grayscale characteristic is obtained by combining the reference γ characteristic of the "γ correction" shown in FIG. 4A and the grayscale characteristic of the "grayscale point adjusting" shown in FIG. 3A.

Alternatively, the image signal adjusting may be performed in an order of the adjusting the gamma correcting unit 22 and the adjusting of the grayscale point adjusting unit 21.

In such a construction, various types of adjusting may be implemented by using various combinations of a "natural", "dynamic", or "theater" mode in the reference γ characteristic having a γ value of 2.0 and the color modes in the reference γ characteristic having a γ value of 2.3.

Now, the "grayscale point adjusting" of the grayscale point adjusting unit 21 as the first step is described more in detail.

In the graph shown in FIG. 3A, there are nine adjusting points (grayscale 1 to 9), and six points thereof are set to the intermediate grayscale value, that is, the grayscale value 511 or less.

In addition, one point (grayscale 7) among the remaining three points is set to a substantially intermediate grayscale value such as the grayscale value 512, so that about 78% of the adjusting points are set to be in an input grayscale range of from a low grayscale to an intermediate grayscale. According to an empirical result, more adjusting points are provided to a grayscale range having more adjusting frequencies.

In order to select an adjusting point among a plurality of the adjusting points and adjust the output grayscale value, the "custom" characteristic among the selection items of the "gamma" adjusting is selected, and a to-be-adjusted image portion or adjusting point is designated in the "cursor" adjusting mode or the "graph" adjusting mode.

For example, in the "cursor" adjusting mode, when a lower left image portion of the image projected on the screen SC shown in FIG. 1 is selected by the selection cursor 51, the adjusting point (for example, grayscale 4) closest to the grayscale value of the selected image portion in the graph shown in FIG. 3A is selected.

The adjusting of the output grayscale value at the selected adjusting point is performed by using "up" and "down" buttons or "left" and "right" buttons functioning as "plus and minus" buttons in the manipulator 1 or the remote controller 2. For example, in the grayscale adjusting screen G4 shown in FIG. 9B, the "left" and "right" buttons function as the plus and minus" buttons, and in the grayscale adjusting screen G12 shown in FIG. 17A, the "up" and "down" buttons function as the plus and minus" buttons.

The grayscale amount per one step in the one-time increment and decrement manipulation using the plus and minus buttons is as follows. For example, when the plus button is manipulated one time from the adjusting point "grayscale 4", the output grayscale value is increased by one step amount "4 counts" as a predetermined grayscale value. Similarly, when the minus button is manipulated one time, the output grayscale value is decreased by one step amount "4 counts". In addition, the plus or minus button is continuously pushed, so that the output grayscale value is continuously increased or decreased according to a continuously pushing time.

The adjusting grayscale amount as a predetermined grayscale amount per one step in the one-time increment and decrement manipulation at the adjusting points is defined in advance.

FIG. 3B is a table showing a grayscale amount per one step at each adjusting point shown in FIG. 3A.

As shown in FIG. 3B, the grayscale amounts at the adjusting points are set to one step amount "2 counts" for the adjusting points "grayscale 8, 9" in a high grayscale range and one step amount "4 counts" for the adjusting points in low and intermediate grayscale ranges, so that a larger adjusting amount is set to the low and intermediate grayscale ranges than the high grayscale range.

The adjusting amount are set based on the empirical result that the adjusting amount of the grayscale value in the high grayscale range is smaller than those in the low and intermediate ranges.

Details of Selection Cursor

Figure 5A:
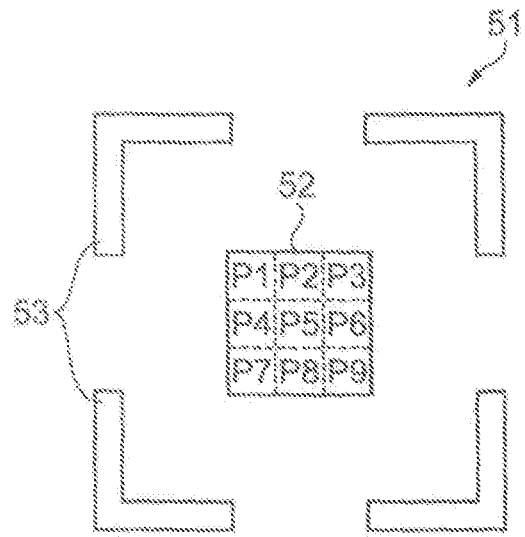
FIG. 5A is an enlarged view showing a selection cursor according to an embodiment.
Figure 5B:
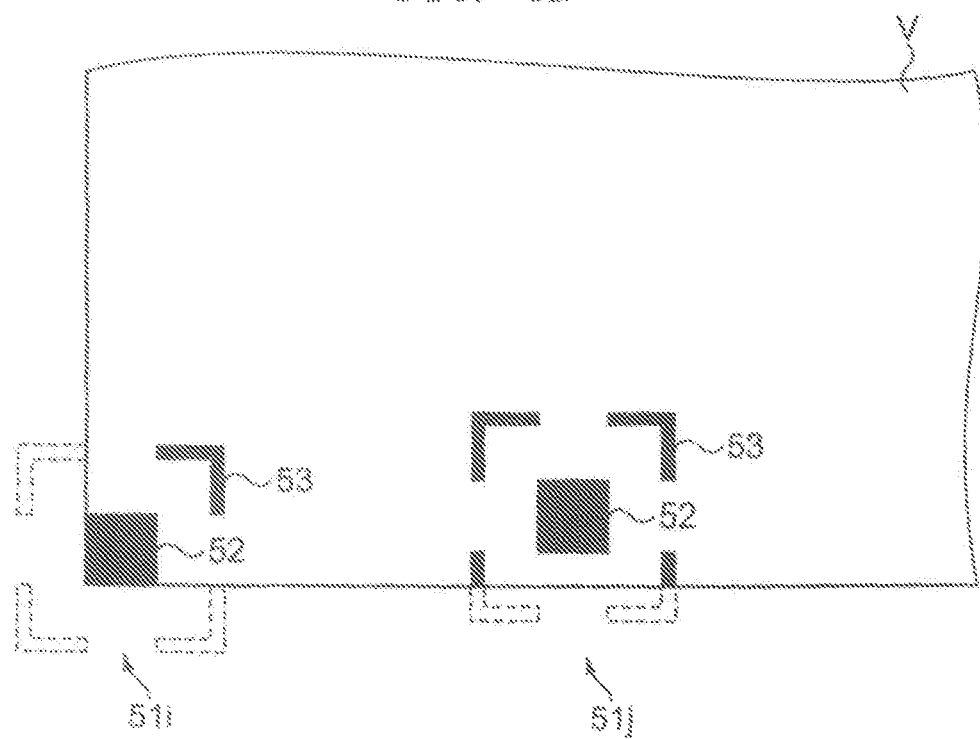
FIG. 5B is a view showing an example of a selection status of a image portion obtained by using the selection cursor.

FIG. 5A is an enlarged view showing an example of the selection cursor. FIG. 5B is a view showing an example of a selection status of an image portion selected by using the selection cursor.

Now, the selection cursor 51 used for the "cursor" adjusting mode is described in detail. FIG. 5A is an enlarged view showing the selection cursor 51 which selects a lower left image portion in the image projected on the screen SC shown in FIG. 1.

The selection cursor 51 includes a pixel selection portion 52 and an annular portion 53.

The pixel selection portion 52 represents a selection region where a desired image portion is to be selected in the image and selects pixels included in the selection region among effective display pixels of the liquid crystal light valves 5R, 5G, and 5B, that is, the display units. In case of the pixel selection portion 52, nine pixels P1 to P9 including three consecutive pixels in each of the vertical and horizontal directions becomes the selection region. The number of pixels is not limited to 9, but it may be the number of pixels which include three or more consecutive pixels in each of the vertical and horizontal directions.

The annular portion 53 is disposed so as to surround the pixel selection portion 52 and set to have the same color tone as that of the pixel selection portion 52. The annular portion 53 always moves together with the pixel selection portion 52, and a positional relation therebetween is always maintained to be constant.

Since the construction is characteristic in that the pixel selection portion 52 is surrounded by the annular portion 53, although a size of the selection cursor 51 is small, a position of the selection cursor 51 in the image on the screen SC shown in FIG. 1 can be distinctively identified.

The selection cursor 51 is overlapped by the OSD unit 20 in a state that the image data for the RGB signals are recorded in the frame memory 17 in the scaling process of the scaler unit 19. The position of the selection cursor 51 are identified by the CPU 23 based on the moving amount from an initial setting address in the address of the frame memory 17 according to the "up" and "down" buttons and "left" and "right" buttons. The initial setting position of the selection cursor 51 is a substantially central portion of the image.

The grayscale value of the pixel selected by the selection cursor 51 is obtained as luminescence signal data (Y signal data) by calculating the image data of the selected pixel in the frame memory 17 where the image data for the RGB signals are recorded. More specifically, the luminescence signal data is obtained through such a calculation as "Y=0.299R+0.587G+0.144B".

The projector 100 identifies an average value of the grayscale values excluding the maximum and minimum grayscale values from the obtained grayscale values (Y signals) of the nine pixels as the grayscale value of the selected image portion. The process is performed in order to remove extraneous pixel components caused from noises in the image. Alternatively, an average value of the grayscale values of all the selected pixels may be identified as the grayscale value of the selected image portion.

FIG. 5B shows another example of the selection cursor which selects edges of an image V. When the position of the selection cursor 51 reaches the edge of the image V, the CPU unit 23 controls the entire portions of the pixel selection portion 52 not to protrude from the image V. In the figure, the image V is shown to be a bright image having all the grayscale values close to a white color.

The selection cursors 51i and 51j select the lower left portions of the image V. For the convenience of description, the selection cursors 51i and 51j are displayed to be disposed on the same screen. However, in an actual case, only the one of the selection cursors is displayed.

The pixel selection portion 52 of the selection cursor 51i selects nine pixels in the lowest end of the lower left portion of the image V. In such a construction, the annular portion 53 is displayed on only the inner portion of the image V.

Similarly, the selection cursor 51j which selects the pixels in the lower left portion of the image V is displayed on only the inner portion of the image V.

In such a construction, even in a case where the edge of the image V is selected by the selection cursor, since a shape of the annular portion 53 is displayed within the image V, the selection cursor can be distinctively identified.

Both of the selection cursors 51i and 51j which are displayed on the bright image V close to a white color have a black tone. On the other hand, in the image on the screen SC shown in FIG. 1, the selection cursor 51 has a white color.

The color tone of the selection cursor is controlled by the CPU unit 23 so that the color tone becomes one of white and black tones and the contrast to the selected image portion becomes larger according to the grayscale of the selected image portion.

Procedures of First Image Adjusting Process 1

Figure 6:
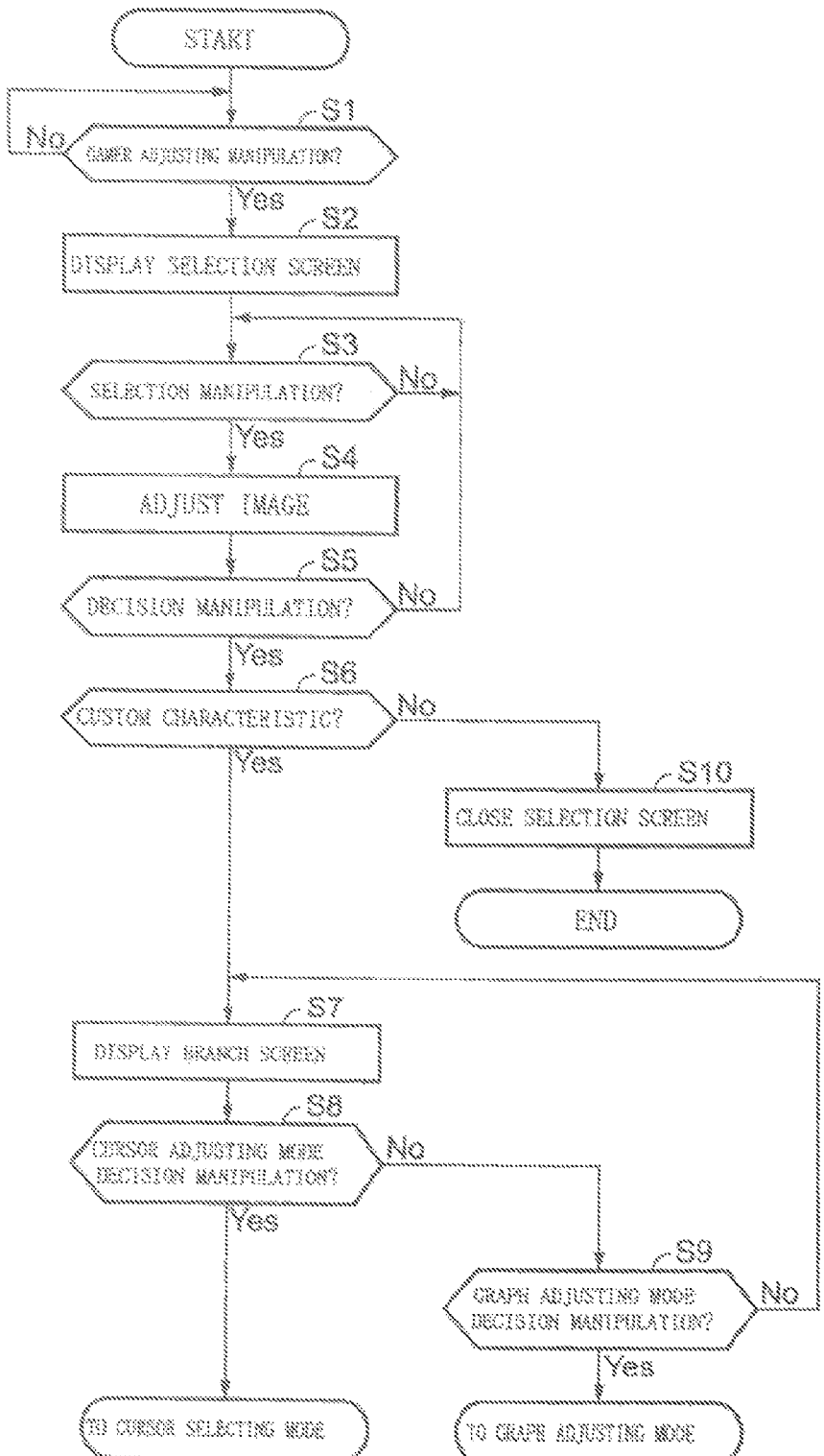
FIG. 6 is a flowchart for explaining operations of a projector at a time of performing gamma adjusting.
Figure 7A:
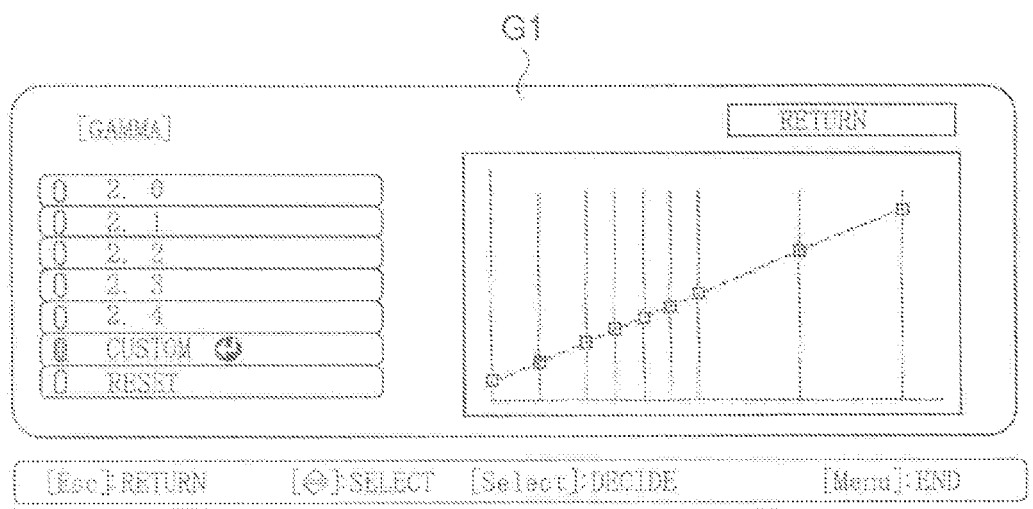
FIG. 7A is a view showing an example of a selection screen.
Figure 7B:
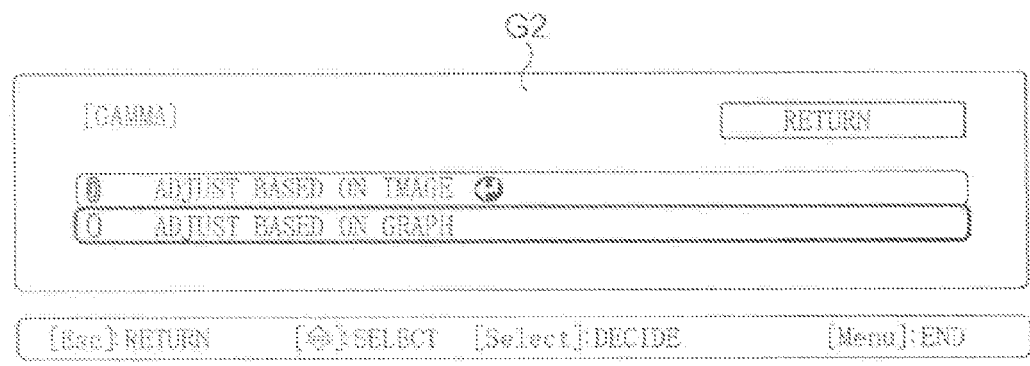
FIG. 7B is an example of a branch screen.

FIG. 6 is a flowchart for explaining operations of the projector 100 at a time of performing the "gamma" adjusting. FIG. 7A is a view showing an example of the selection screen, and FIG. 7B is a view showing an example of a branch screen.

Now, the operations according to the first embodiment at the time of performing the "gamma" adjusting are described with reference to mainly FIG. 6 and additionally FIGS. 7A, 7B, and 2.

The projector 100 is constructed with such a configuration as shown in FIG. 1 and manipulated by the remote controller 2.

In Step S1, the controller 10 determines whether or not there is a manipulation for performing the "gamma" adjusting according to a manipulation signal from the manipulation receiving unit 11. When there is the manipulation for performing the "gamma" adjusting, the process proceeds to Step S2. Where there is not manipulation, the manipulation is waited for. The "grayscale adjusting program" of the storage unit 14 is started by the manipulation, and the following processes are performed according toe the procedures and contents of the grayscale adjusting defined in the program.

In Step S2, the controller 10 allows the image signal processing unit 16 to overlap the selection screen G1 shown in FIG. 7A with the image signal.

Five γ values of from 2.0 to 2.4 as selection items of the grayscale characteristic and "custom" and "reset" as seven selection items of the custom characteristic are displayed on the selection screen G1. A graph representing the selected grayscale characteristics is displayed on the right side of the selection items. The selection screen G1 shows a state that the "custom" is selected, and a graph at the right side of the screen shows the grayscale characteristics.

The graph of the selection screen G1 shows the grayscale characteristics obtained by combining the "γ correction" and the adjusting characteristics of the "grayscale point adjusting". However, the straight line denotes the reference γ characteristic having a γ value of 2.2. In the initial setting of the projector 100, since the reference γ characteristic has a γ value of 2.2, the scale axis of the graph is set to be represented by a straight line when the γ value is 2.2. In the initial setting of the custom characteristic, the reference γ characteristic is also set to have a γ value of 2.2.

In addition, in various manipulation screens described later, graphs thereof may be set the same scale axis.

Under the selection screen G1, the manipulation button names corresponding to the manipulator 1 or the remote controller 2 for manipulating the selection screen G1 are displayed. More specifically, "Esc button" for returning the manipulation step to one-step-before manipulation step, "Up Down button" for selecting the grayscale characteristic, "Select button" for deciding the selected grayscale characteristic, and "Menu button" for ending the adjusting are displayed. In the other manipulation screens described later, such manipulation guiding display has the same meaning.

In the later description, when a new manipulation screen is displayed, the previously displayed manipulation screens are closed. In addition, after the manipulation screen is displayed, if any manipulation is not performed for a predetermined time interval, for example, two minutes, the manipulation screen, and the adjusting is treated to end.

In Step S3, the controller 10 determines whether or not there is a selection manipulation of selecting one characteristic from the selection items of the grayscale characteristics on the selection screen G1 based on the manipulation signal from the manipulation receiving unit 11. When there is a selection manipulation, the process proceeds to Step S4. When there is no selection manipulation, the manipulation is waited for.

In Step S4, the controller 10 sets the γ correction data of the selected grayscale characteristic to the LUT of the gamma correcting unit 22 and project the image adjusted according to the grayscale characteristic. In the step, the image projected on a background of the selection screen G1 becomes the image adjusted according to the selected grayscale characteristic.

In Step S5, the controller 10 determines whether or not there is a decision manipulation of deciding the selected grayscale characteristic based on the manipulation signal from the manipulation receiving unit 11. When there is the decision manipulation, the process proceeds to Step S6, when there is no decision manipulation, the process returns to Step S3, so that the selection manipulation is received unit the decision manipulation is performed.

In Step S6, the controller 10 determines whether or not the decided grayscale characteristic is the "custom" characteristic. When there is the "custom" characteristic, the process proceeds to Step S7. When there is no "custom" characteristic, the process proceeds to Step S10. In addition, when there is the "custom" characteristic, the operations of from an operation of proceeding to a process for changing the grayscale characteristic, that is, a correlation between the input grayscale value and the output grayscale value to an manipulation of selecting and deciding the "custom" characteristic correspond to a starting manipulation for starting changing the correlation.

In Step S7, the controller 10 allows the image signal processing unit 16 to overlap the branch screen G2 shown in FIG. 7B with the image signal.

A selection items for selecting one of the "cursor" adjusting mode represented by "adjust based on an image" and "graph" adjusting mode represented by "adjust based on a graph" is displayed on the branch screen G2. The branch screen G2 shows a state that the "cursor" adjusting mode is selected.

In Step S8, the controller 10 determines whether or not there is a selection decision manipulation of selecting and deciding the "cursor" adjusting mode based on the manipulation signal from the manipulation receiving unit 11. When there is the selection decision manipulation, the process proceeds to a subroutine of "cursor" adjusting mode. When there is no selection decision manipulation, the process proceeds to Step S9.

In Step S9, the controller 10 determines whether or not there is a selection decision manipulation of selecting and deciding the "graph" adjusting mode based on the manipulation signal from the manipulation receiving unit 11. When there is the selection decision manipulation, the process proceeds to a subroutine of the "graph" adjusting mode. When there is not selection decision manipulation, the process returns to Step S7 and waits for the selection and decision manipulations.

Next, a case where the decided grayscale characteristic is not the "custom" characteristic in Step 6 is described.

In Step S10, the controller 10 allows the image signal processing unit 16 to close the selection screen G1 in a state the γ correction data of the selected and decided grayscale characteristic is set to the LUT of the gamma correcting unit 22, so that the "gamma" adjusting ends.

In addition, the record that the cursor" adjusting mode or the "graph" adjusting mode is selected and decided is stored in the storage unit 14, and at the time of the next manipulation, in Step S7, the branch screen is displayed in a state that the stored adjusting mode is selected.

In addition, when the selected grayscale characteristic is the "custom" characteristic, Step S6 is not limited to displaying of the branch screen G2. Alternatively, it may be a process routine of directly performing one of "graph" and "cursor" adjusting modes.

Procedures of First Image Adjusting Process 2: Cursor Adjusting Mode

Figure 8:
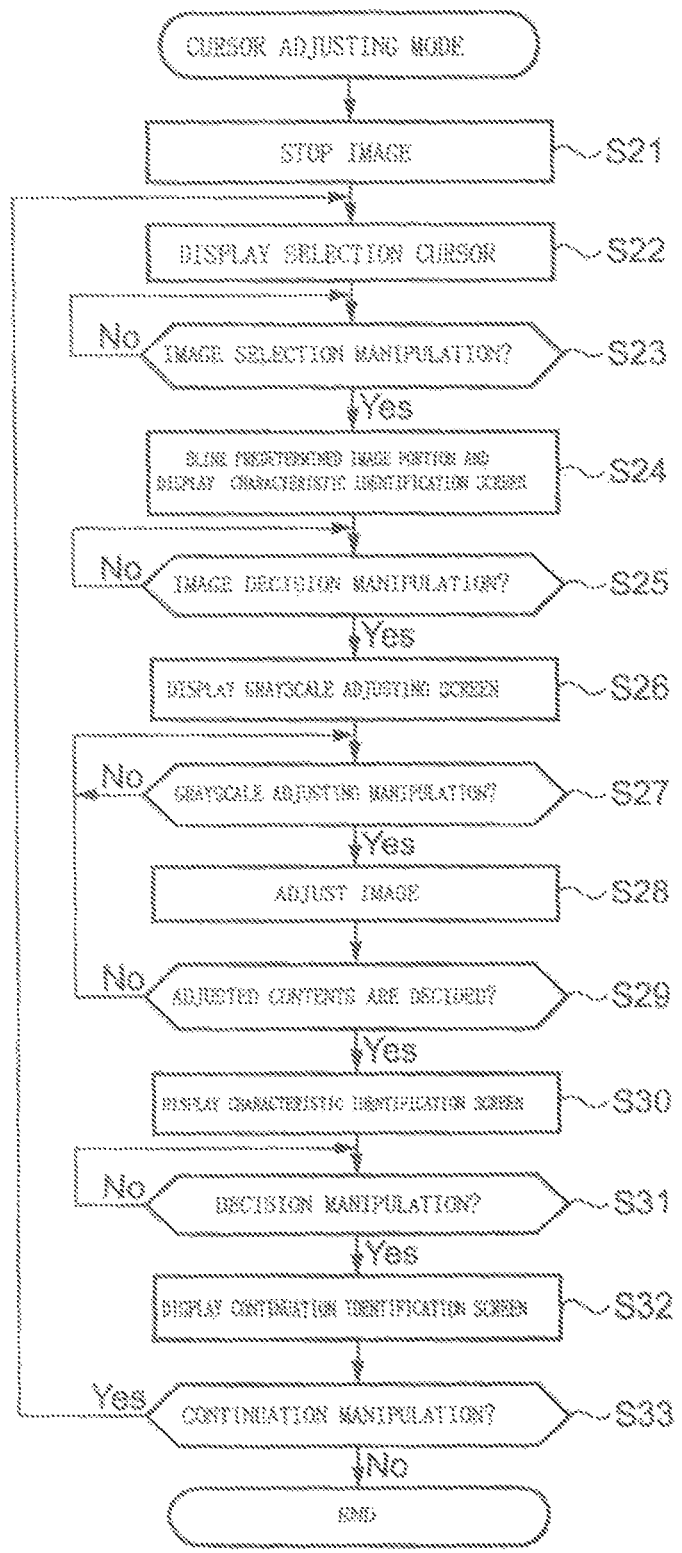
FIG. 8 is a flowchart for explaining operations of customizing a grayscale characteristic in a cursor adjusting mode.
Figure 9A:
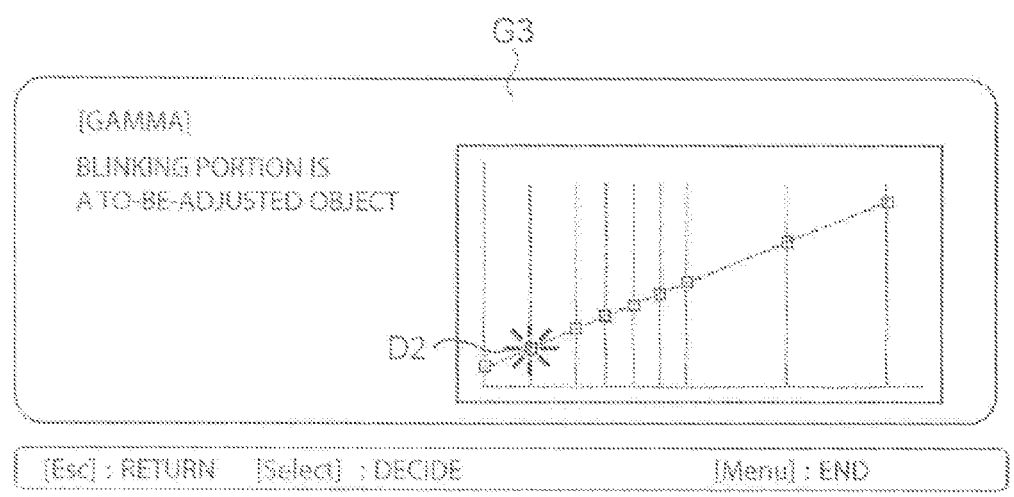
FIG. 9A is a view showing an example of a characteristic identification screen.
Figure 9B:
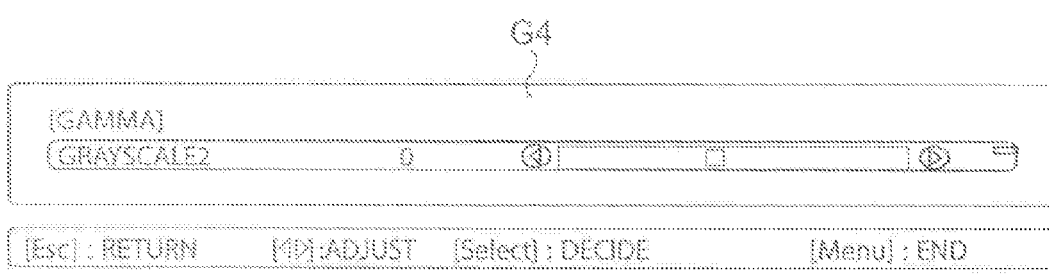
FIG. 9B is a view showing an example of a grayscale adjusting screen.
Figure 10A:
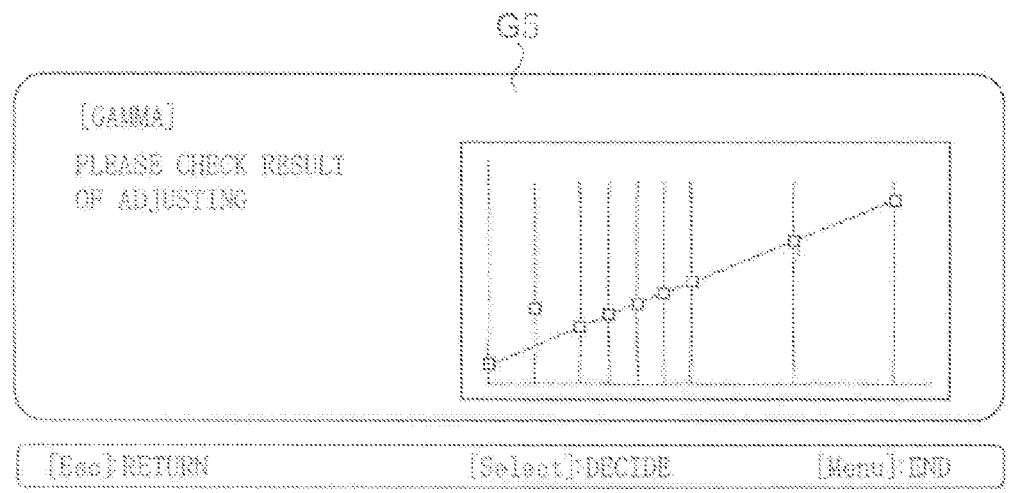
FIG. 10A is a view showing an example of a characteristic identification screen.
Figure 10B:
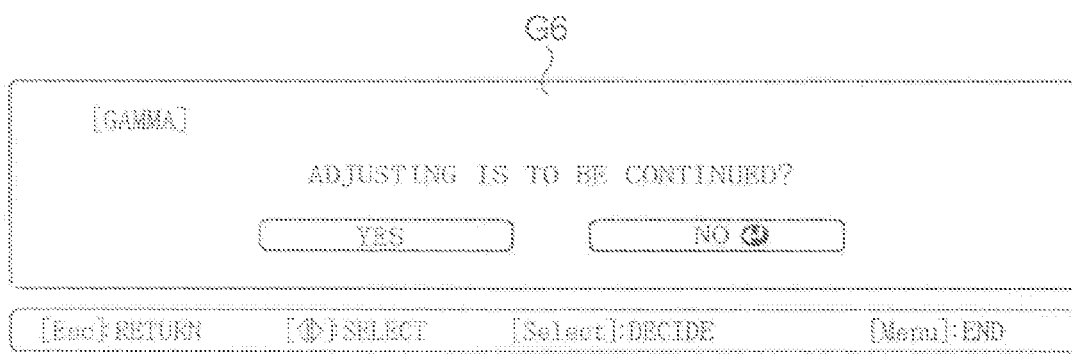
FIG. 10B is a view showing an example of a continuation identification screen.

FIG. 8 is a flowchart for explaining operations at a time of customizing the grayscale characteristic in the "cursor" adjusting mode. FIG. 9A is a view showing an example of a characteristic identification screen, and FIG. 9B is a view showing an example of a grayscale adjusting screen. FIG. 10A is a view showing an example of the characteristic identification screen, and FIG. 10B is a view showing an example of a continuation identification screen.

Now, the operations at the time of customizing the grayscale characteristic in the "cursor" adjusting mode are described with reference to mainly FIG. 8 and additionally FIGS. 9A, 9B, 10A, 10B, and 2.

In Step S21, the controller 10 allows the image signal processing unit 16 to stop the image. This is because a moving image is not easy to select an image portion thereof.

In Step S22, the controller 10 allows the image signal processing unit 16 to overlap the "selection cursor" with the image signal. The state is the same as that of the selection cursor 51 on the image in the screen SC shown in FIG. 1.

In Step S23, the controller 10 determines whether or not there is an image selection manipulation of selecting a predetermined image portion by the "selection cursor" based on the manipulation signal from the manipulation receiving unit 11. When there is the image selection manipulation, the process proceeds to Step S24. When there is no image selection manipulation, the image selection manipulation is waited for.

In Step S24, the controller 10 allows the image signal processing unit 16 to blink the selected image portion and an image portion having a grayscale substantially equal to that of the selected image portion and overlap the characteristic identification screen G3 shown in FIG. 9A with the image signal.

In the process, firstly, the controller 10 reads out the image data for the RGB colors of the selected image portion selected by the "selection cursor" from the frame memory 17 and obtains the luminescence signal data (Y signal data) from the image data of the pixels. Next, the controller obtains an average value of the Y signal data excluding the maximum and minimum grayscale values from the Y signal data of the pixels. Next, the adjusting point closet to the obtained Y signal data is selected as the to-be-adjusted adjusting point.

In addition, the blinking of the image portion is performed by changing the output grayscale value of the selected adjusting point in the "grayscale correction date" of the grayscale point adjusting unit 21 (LUT) in a period of 1 Hz at plus 32 counts and minus 32 counts of the initial output grayscale value.

In addition, on the characteristic identification screen G3, a state that the adjusting point "grayscale 2" is selected is displayed, and a dot displayed portion D2 of the adjusting point "grayscale 2" is blinked in synchronization with the blinking cycle of the image portion. The method of displaying the dot displayed portion is not limited to the blinking thereof. Alternatively, a method of changing the color tone of the dot displayed portion into other color tones such as orange different from those of the other dot displayed portions may be used.

In Step S25, the controller 10 determines whether or not there is an image decision manipulation of deciding the selected image portion, that is, the selected adjusting point based on the manipulation signal from the manipulation receiving unit 11. When there is the image decision manipulation, the process proceeds to Step S26. When there is no image decision manipulation, the image decision manipulation is waited for.

In Step S26, the controller 10 allows the image signal processing unit 16 to stop blinking of the image portion and overlap the grayscale adjusting screen G4 shown in FIG. 9B with the image signal. In addition, Step S24 may be a process routine of displaying the grayscale adjusting screen G4 instead of the characteristic identification screen G3. In such a procedure, the determination of the image decision manipulation in Step S25 is not needed, and the blinking of the image portion is stopped by using the adjusting manipulation to the grayscale adjusting screen G4 as a trigger.

In Step S27, the controller 10 determines whether or not there is a manipulation of adjusting the output grayscale value based on the manipulation signal from the manipulation receiving unit 11. When there is the adjusting manipulation, the process proceeds to Step S28. When there is no adjusting manipulation, the adjusting manipulation is waited for.

In step S28, the controller 10 sequentially corrects the "grayscale correction data" according to the adjusting manipulation, sets the corrected "grayscale correction data" to the LUT of the grayscale point adjusting unit 21, and performs the adjusting of the image signal based on the grayscale characteristic. In this step, the image projected on a background of the grayscale adjusting screen G4 becomes the image adjusted in real-time according to the grayscale characteristic corresponding to the adjusted contents.

In Step S29, the controller 10 determines whether or not there is a manipulation of deciding the adjusted contents based on the manipulation signal from the manipulation receiving unit 11. When there is the decision manipulation, the process proceeds to Step S30. When there is no decision manipulation, the process returns to Step S27 and receives the adjusting manipulation until there is the decision manipulation.

In Step S30, the controller 10 allows the image signal processing unit 16 to overlap the characteristic identification screen G5 shown in FIG. 10A with the image signal. On the characteristic identification screen G5, a graph representing the grayscale characteristic subjected to the grayscale point adjusting is displayed.

In Step S31, the controller 10 determines whether or not there is a manipulation of deciding the adjusting result based on the manipulation signal from the manipulation receiving unit 11. When there is the decision manipulation, the process proceeds to Step S32. When there is no decision manipulation, the decision manipulation is waited for. When there is the decision manipulation, the adjusted contents are stored as the "grayscale correction data" of the "custom" characteristic in the storage unit 14. In addition, a manipulation screen for naming the previously adjusted "custom" characteristics is displayed. For example, there may be provided a process routine for naming the characteristics, for example, "custom 1", "custom B" and storing the characteristics.

In Step S32, the controller 10 allows the image signal processing unit 16 to overlap the continuation identification screen G6 shown in FIG. 10B with the image signal. On the continuation identification screen G6, an identification indicator for determining whether or not the adjusting of the "cursor" adjusting mode is continued is displayed.

In Step S33, the controller 10 determines whether or not there is a manipulation of continuing the adjusting based on the manipulation signal from the manipulation receiving unit 11. When there is the continuation manipulation, the process returns to Step S22 and continues the adjusting of the "cursor" adjusting mode by using the previously adjusted "grayscale correction data" as base data. When there is no continuation manipulation, the continuation identification screen G6 is closed, so that the adjusting of the "cursor" adjusting mode ends.

Figure 11:
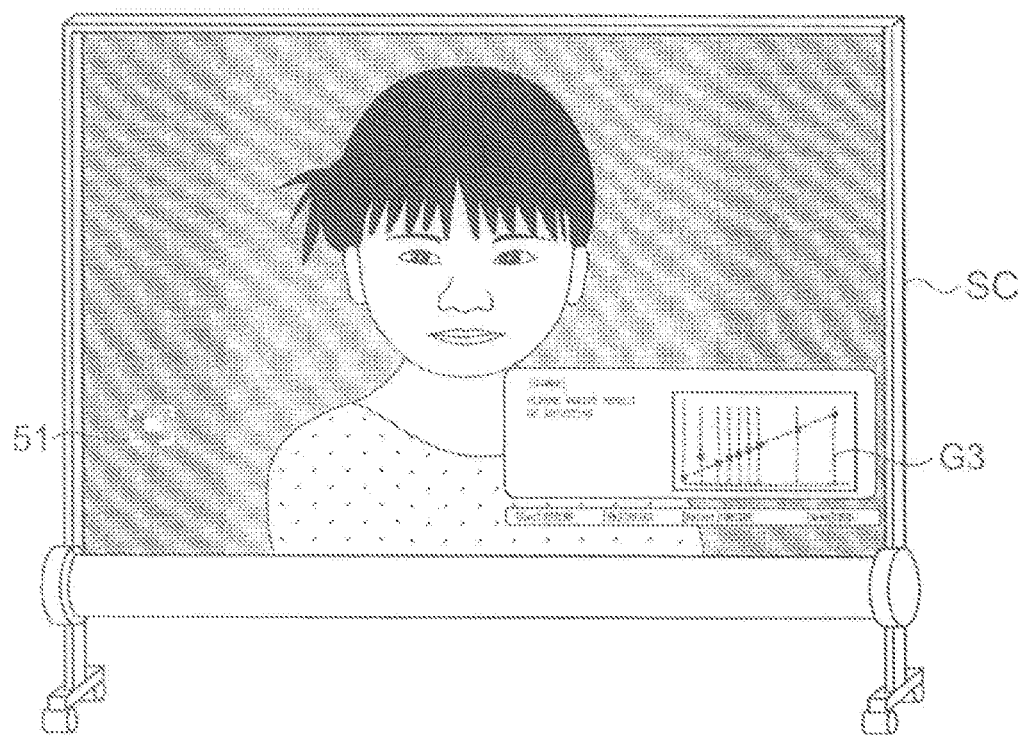
FIG. 11 is a view showing an example of a manipulation screen displayed to overlap an image.

FIG. 11 is a view showing an example of the manipulation screen displayed so as to overlap the image. Now, the displayed positions of the characteristic identification screen and the grayscale adjusting screen are described.

In Step S24, the characteristic identification screen G3 shown in FIG. 9A is overlapped with the image signal by using the image signal manipulation as a trigger. However, with respect to the displayed position of the characteristic identification screen G3, the characteristic identification screen G3 is displayed at a lower right portion of the screen as shown in FIG. 11. This is because the image signal processing unit 16 controls the characteristic identification screen G3 not to be overlapped with the image portion selected by the selection cursor 51. For the convenience of description, in FIG. 11, the selection cursor 51 together with the characteristic identification screen G3 are displayed on the same screen. However, as described above, in an actual case, both are not displayed on the same screen.

In addition, the displayed positions in the initial setting of the manipulation screens such as the branch screen G2, the characteristic identification screens G3, G5, G7, and G9, the grayscale adjusting screens G4 and G8 are set at the lower left portion of the image. However, the displayed positions on the characteristic identification screens G3, G5, G7, and G9 and the grayscale adjusting screens G4 and G8 are controlled so as not to be overlapped with the selected image portion or the image portion corresponding to the selected adjusting point. In addition, the sizes of the manipulation screens are set to be ¼ or less of the image area like the characteristic identification screen G3.

Now, the reasons that, in Step S24, the blinking of the image portion is performed by increment and decrement of ±32 counts of the output grayscale value and the blinking period is set to be 1 Hz are described.

An output grayscale value of a general image display apparatus is displayed with 8 to 10 bits, so that 256 to 1024 output grayscale values are generated. When a portion of the screen is visualized by the blinking of the image portion, if the blinking level is periodically increased and decreased from the "zero" level to "maximum" level according to the full scale of the output grayscale level, since the contrast is too high, the image is flickered, so that observer's eyes become fatigued. In addition, since the response of the display unit cannot be caught up with, an inharmonious image may be formed. In order to prevent this phenomenon, the blinking of the selected image portion is preferably performed with a grayscale amount of ±10% or less of the full scale of the output grayscale value.

Therefore, although the increment and decrement amounts of the output grayscale value are set to be ±32 counts, the amounts are not limited thereto. Alternatively, the grayscale amount of ±10% or less of the full scale of the output grayscale value may be used.

The reason that the blinking period is set to 1 Hz is that, with respect to the visual characteristic of a human, it is known that, if the blinking period exceeds 3 Hz, unpleasant feeling caused from the flickering of the image is increased. Therefore, the blinking period is not limited to 1 Hz, but it may be in a range of from 0.5 Hz to 3 Hz.

Procedures of Image Adjusting Process 3: Graph Adjusting Mode

Figure 13A:
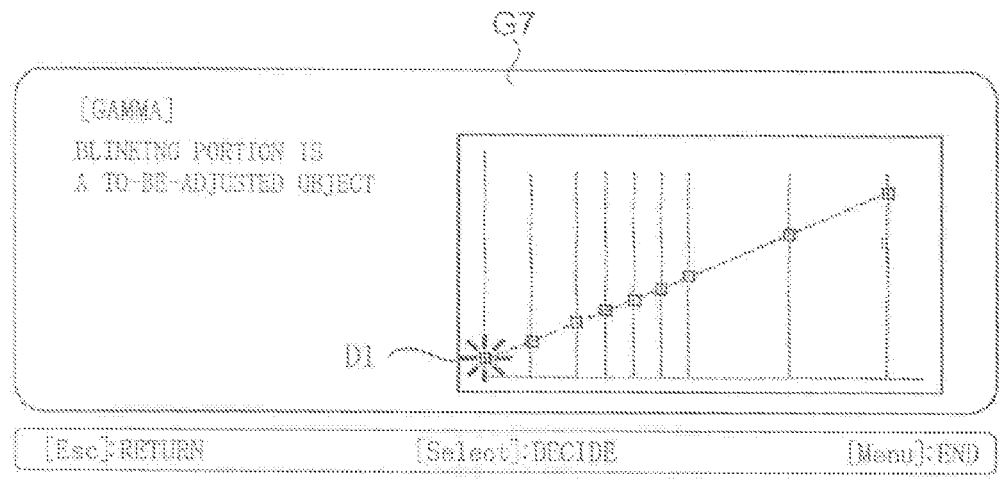
FIG. 13A is a view showing an example of a characteristic identification screen.
Figure 13B:
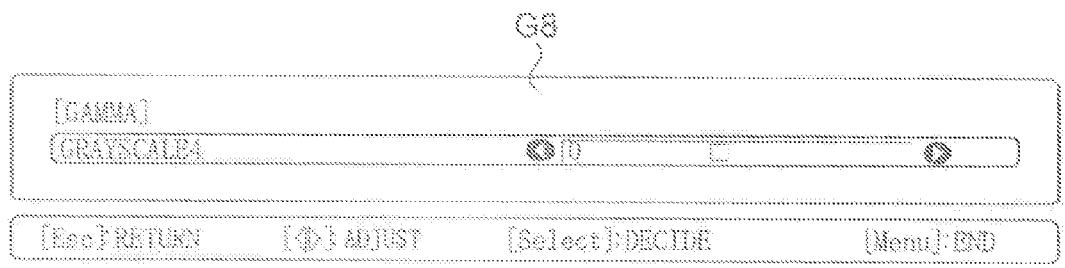
FIG. 13B is a view showing an example of a grayscale adjusting screen.
Figure 13C:
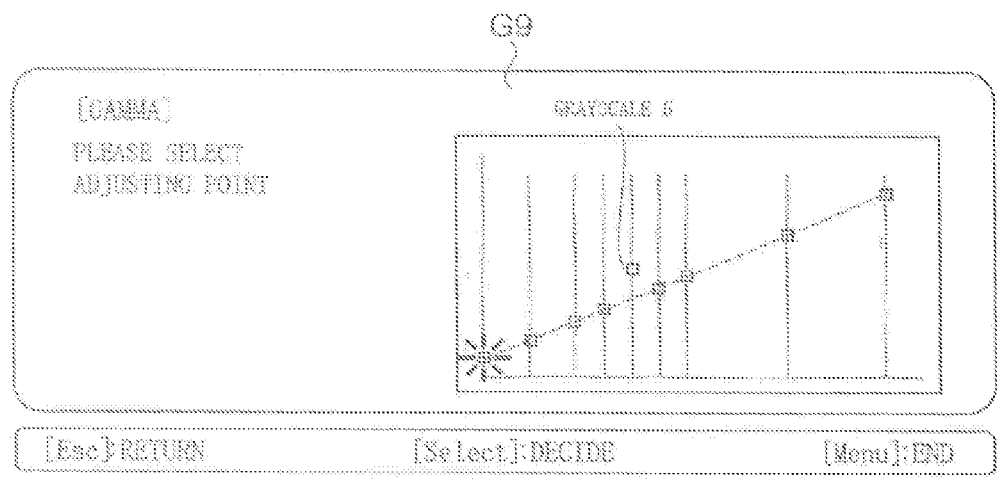
FIG. 13C is view showing another example of a characteristic identification screen.

FIG. 12 is a flowchart for explaining operations at a time of customizing the grayscale characteristic in the "graph" adjusting mode. FIGS. 13A and 13C are view showing an example of a characteristic identification screen, and FIG. 13B is a view showing an example of a grayscale adjusting screen.

Now, the operations at the time of customizing the grayscale characteristic in the "graph" adjusting mode are described with reference to mainly FIG. 12 and additionally FIGS. 13A, 13B, 13C, and 2.

In Step S41, the controller 10 allows the image signal processing unit 16 to stop the image.

In Step S42, the controller 10 allows the image signal processing unit 16 to overlap the characteristic identification screen G7 shown in FIG. 13A with the image signal. On the characteristic identification screen G7, the adjusting point "grayscale 1" is displayed in a selected state, and the image portion corresponding to the adjusting point "grayscale 1" is blinked in a period of 1 Hz. In the dot displayed portion D1 having the adjusting point "grayscale 1" is synchronously blinked.

With respect to the method of displaying the dot displayed portion, a method of changing the color tone of the dot displayed portion into other color tones such as orange different from those of the other dot displayed portions may be used.

In Step S43, the controller 10 determines whether or not there is a manipulation of selecting the adjusting point based on the manipulation signal from the manipulation receiving unit 11. When there is the selection manipulation, the process proceeds to Step S44. When there is no selection manipulation, the selection manipulation is waited for.

In Step S44, the controller 10 allows the image signal processing unit 16 to blink the image portion corresponding to the selected adjusting portion in a period of 1 Hz. In addition, the dot displayed portion of the selected adjusting point on the characteristic identification screen G7 is also synchronously blinked. In addition, the blinking of the image portion is performed by changing the output grayscale value of the selected adjusting point in the "grayscale correction date" of the grayscale point adjusting unit 21 (LUT) in a period of 1 Hz at plus 32 counts and minus 32 counts of the initial output grayscale value.

In Step S45, the controller 10 determines whether or not there is a manipulation of deciding the selected adjusting point based on the manipulation signal from the manipulation receiving unit 11. When there is the decision manipulation, the process proceeds to Step S46. When there is no decision manipulation, the process returns to Step S43 and receives the selection manipulation unit the decision manipulation is performed.

In Step S46, the controller 10 allows the image signal processing unit 16 to stop the blinking of the image portion and overlap the grayscale adjusting screen G8 shown in FIG. 13B with the image signal. Alternatively, Step S44 may be a process routine of closing the characteristic identification screen G7 and displaying the grayscale adjusting screen G8. In such a procedure, the determination of the selection decision manipulation in Step S45 is not needed, and the blinking of the image portion is stopped by using the adjusting manipulation to the grayscale adjusting screen G8 as a trigger.

In Step S47, the controller 10 determines whether or not there is a manipulation of adjusting the output grayscale value based on the manipulation signal from the manipulation receiving unit 11. Where there is the adjusting manipulation, the process proceeds to Step S48. When there is no adjusting manipulation, the adjusting manipulation is waited for.

In step S48, the controller 10 sequentially corrects the "grayscale correction data" according to the adjusting manipulation, sets the corrected "grayscale correction data" to the LUT of the grayscale point adjusting unit 21, and performs the adjusting of the image signal based on the grayscale characteristic. In such a construction, the projected image adjusted according to the corrected grayscale characteristic is displayed on a background of the grayscale adjusting screen G8.

In Step S49, the controller 10 determines whether or not there is a manipulation of deciding the adjusted contents based on the manipulation signal from the manipulation receiving unit 11. When there is the decision manipulation, the process returns to Step S42. When there is no decision manipulation, the process returns to Step S47 and receives the adjusting manipulation until the decision manipulation is performed.

In addition, when there is the decision manipulation, the manipulation screen displayed in Step S42 becomes the characteristic identification screen G9 shown in FIG. 13C. In the characteristic identification screen G9, the output grayscale value of, for example, the adjusting point "grayscale 5" is the grayscale value including the previously performed adjusted contents. In addition, the adjusted contents are stored as the "grayscale correction data" of the "custom" characteristic in the storage unit 14 in advance. In addition, a manipulation screen for naming the previously adjusted "custom" characteristics is displayed. For example, there may be provided a process routine for naming the characteristics, for example, "custom 1", "custom B" and storing the characteristics.

In the embodiment, the OSD unit 20 which overlaps the branch screen G2, the characteristic identification screens G3, G7, and G9, the grayscale adjusting screens G4 and G8, and the selection cursor 51 on the projected image after the "custom" characteristic is selected among a plurality of the grayscale characteristics displayed on the selection screen G1, the manipulator 1 which receives the manipulations according to the screens, and the controller 10 which controls the OSD unit 20 and the manipulator 1 and corrects the "grayscale correction data" according to the manipulation contents of the manipulator 1 correspond to the grayscale characteristic changing unit according to the embodiment of the invention.

According to the aforementioned embodiment, the following advantages can be obtained.

(1) The storage unit 14 stores a plurality of the grayscale characteristics including the custom characteristic which can customize the characteristic used for the image adjusting. Therefore, since there are a large number of the selection items of the grayscale characteristic, the projector 100 can cope with the selection items corresponding to the user's various preferences.

When the grayscale characteristic of the selection screen G1 is performed, the image signal processing unit 16 adjusts the image signal according to the selected grayscale characteristic, so that the image is projected according the adjusted image signal. Therefore, the image including the adjusted contents on the background of the selection screen G1 can be identified in the step of selecting the adjusted contents, that is, the step before the adjusted contents are decided.

Therefore, in the projector 100, since the image adjusting can be performed according to the user's preferences, the image including the adjusted contents can be identified in the step of selecting the adjusted contents.

(2) The graph representing a correlation between the input and output grayscale levels of the selected grayscale characteristics is included in the selection screen G1. Therefore, the graph representing the selected grayscale characteristic can be visually perceived.

Accordingly, in the projector 100, in addition to the image including the adjusted contents, the graph representing the grayscale characteristic can be identified in the step of selecting the adjusted contents.

(3) In the OSD unit 20, the branch screen G2 which is used to select one of the graph adjusting mode and the cursor adjusting mode by using selecting and deciding the custom characteristic as a trigger is overlapped with the image signal. Therefore, due to the branch screen G2, one of the graph adjusting mode and the cursor adjusting mode can be selected.

Accordingly, in the projector 100, the adjusting method can be selected according to the user's preferences.

(4) The record that the cursor" adjusting mode or the "graph" adjusting mode is selected and decided is stored in the storage unit 14, and at the time of the next manipulation, the branch screen G2 is displayed in a state that the adjusting mode for the selected record is selected. Therefore, a probability that the user performs the selection manipulation for the adjusting mode is reduced.

Accordingly, the projector 100 can be conveniently used.

(5) When the custom characteristic is selected, in any adjusting mode of the "cursor" adjusting mode and the "graph" adjusting mode, the characteristic identification screen, that is, a graph smaller than the image representing the grayscale characteristic in the initial setting of the custom characteristic is displayed. Therefore, due to the characteristic identification screen, the grayscale characteristic in the initial setting of the custom characteristic can be identified.

In addition, in the graph" adjusting mode, when a manipulation of selecting one among a plurality of the dot displayed portions representing the output grayscale levels for the adjusting points in the graph on the characteristic identification screen G7 is performed, the OSD unit 20 stops the overlapping of the characteristic identification screen G7 and overlaps the grayscale adjusting screen G8 smaller than the still image of which output grayscale level of the selected adjusting point is to be adjusted with the image signal. Therefore, due to the grayscale adjusting screen G8, the adjusting of the output grayscale level of the selected adjusting point can be performed.

Accordingly, in the projector 100, after the grayscale characteristic is identified by using the graph, the image adjusting can be performed according to the user's preferences.

(6) When the "cursor" adjusting mode is selected and decided, the selection cursor 51 is displayed, and the image is stopped. Therefore, although the moving image is not easy to select, the selection of the image portion by using the selection cursor 51 can be easily performed on the still image.

In addition, when the manipulation of selecting the image portion is performed by using the selection cursor 51, after the decision manipulation of the selected image portion is performed, the OSD unit 20 overlaps the grayscale adjusting screen G4 smaller than the still image of which output grayscale level at the adjusting points corresponding to the selected image portion is to be adjusted with the image signal. Therefore, due to the grayscale adjusting screen G4, the adjusting of the output grayscale level at the selected adjusting point can be performed.

Accordingly, in the projector 100, since a desired image portion can be easily selected, the image adjusting can be performed according to the user's preferences.

(7) When the adjusting manipulation of the grayscale levels on the grayscale adjusting screens G4 and G8 is performed, the image signal processing unit 16 sequentially adjusts the grayscale value of the image portion corresponding to the adjusting point of the still image according to the output grayscale level which is subjected to the adjusting manipulation. Therefore, the image including the adjusted contents can be identified in real-time in the step of performing the adjusting.

Accordingly, in the projector 100, the image adjusting can be performed according to the user's preferences, and the image including the adjusted contents can be identified in real-time in the step of performing the adjusting.

(8) A plurality of the adjusting points of the custom characteristic are distributed so that a larger number of the adjusting points are distributed to a range of from the low grayscale value to the intermediate grayscale value at the input side. Therefore, in the projector 100, a large number of the adjusting points are provided to the grayscale range needed to improve the "image quality" which the user highly expects in the grayscale adjusting.

In addition, predetermined output grayscale amounts for the adjusting points are set so that a larger amount is provided to the adjusting points in the low grayscale range than the adjusting points in the high grayscale range. The adjusting amounts per one step in the graph adjusting screen and the grayscale adjusting screens G4 and G8 are set to the adjusting amounts satisfying the needed usage.

Accordingly, the projector 100 can be easily used, so that the image adjusting can be performed according to the user's preferences.

(9) The sizes of the manipulation screens including the selection screen G1, the characteristic identification screens G3, G5, G7, and G9, the grayscale adjusting screens G4 and G8, and the branch screen G2 are set to be ¼ or less of the image. Therefore, although the area covered by the manipulation screen is excluded, the image having ¾ or more of the entire area can be identified. In addition, the manipulation screen is disposed in an inner side of one of four corners of the image having a substantially rectangular shape as the initial setting. Therefore, the central portion of the image cannot be covered by the manipulation screen.

In addition, the OSD unit moves the position of the manipulation screen in an inner region of the image so that the selected image portion cannot be overlapped with the manipulation screen. Therefore, the adjusting state of the selected image portion which needs to be most carefully adjusted can be identified at the time of the adjusting.

Accordingly, in the projector 100, the image adjusting can be performed while the image state is always identified.

(10) The grayscale characteristic in the default initial setting of the custom characteristic can be changed and is set to one grayscale characteristic among a plurality of the grayscale characteristics stored in the storage unit 14. Therefore, the grayscale characteristic according to the user's preferences can be selected as a reference characteristic.

In addition, the adjusted custom characteristic is stored in the storage unit 14, and when the selection screen G1 is displayed at the time of the next manipulation, the adjusted custom characteristic is displayed as one of the selection items of a plurality of the grayscale characteristics. Therefore, the adjusted custom characteristics are stored, so that it can be easily reproduced.

Accordingly, the projector 100 can be easily used, so that the image adjusting can be performed according to the user's preferences.

(11) In the "cursor" adjusting mode, when the manipulation for the image adjusting is performed, the image signal processing unit 16 stops the image and displays the selection cursor 51 for selecting the desired image portion on the image. Even in case of a moving image where the image portion is not easy to selection due to a change of the image, since the image is stopped, so that the image portion can be easily selected. In addition, the desired image portion can be selected from the still image by using the selection cursor 51.

When the manipulation of selecting the image portion by using the selection cursor 51 is performed, the OSD unit 20 blinks the adjusting point corresponding to the selected image portion or overlap the characteristic identification screen G3 where the color tone of the adjusting point is changed with the image signal. Therefore, the grayscales of the image portions over the entire grayscale range are distinctively represented on the graph. Accordingly, the to-be-adjusted adjusting point can be identified by using the graph before the grayscale adjusting is performed.

In addition, when the manipulation of deciding the selected image portion is performed, the OSD unit 20 overlaps the grayscale adjusting screen G4 at the adjusting point corresponding to the grayscale of the selected image portion with the image signal. Therefore, due to the grayscale adjusting screen G4, the grayscale adjusting of the selected image portion can be performed.

Accordingly, in the projector 100, the desired adjusting portion can be selected from the projected image, and the image adjusting for the selected adjusting portion can be performed after the grayscale characteristic is identified.

(12) The image signal processing unit 16 includes a gamma correcting unit 22 which corrects one reference γ characteristic among a plurality of the reference γ characteristics defined in advance in order to match the grayscale characteristics unique to the liquid crystal light valves 5R, 5G, and 5B with the visual characteristics of a human and a grayscale point adjusting unit 21 which adjusts the output grayscale values for a plurality of the adjusting points disposed according to the input levels of the reference γ characteristic. The functions are performed by individual dedicated units. Therefore, since the dedicated constructions can be formed, it is possible to simplify the constructions.

In addition, the grayscale adjusting to the image signal in the image signal processing unit 16 is performed by using the grayscale characteristic obtained by combining the γ correction in the gamma correcting unit and the grayscale point adjusting in the grayscale point adjusting unit 21. Therefore, due to the two adjusting portions, a highly-accurate grayscale adjusting can be performed.

When the adjusting of the output grayscale value in each of the grayscale adjusting screens G4 and G8 of the selected adjusting point is performed, the grayscale point adjusting unit 21 changes the output grayscale value of the adjusting point according to the adjusted contents. Therefore, the image on the background of each of the grayscale adjusting screens G4 and G8 can be updated by an image including the adjusted contents in real-time.

Accordingly, in the projector 100, since the highly-accurate grayscale adjusting can be performed by using a simple grayscale adjusting construction, the image including the adjusted contents can be identified in real-time.

(13) In the "cursor" adjusting mode, the selection cursor 51 includes the pixel selection portion 52 which has a size capable of selecting a plurality of the three or more consecutive pixels in the liquid crystal light valves. Therefore, the selected portion according to the user's intention can be determined based on the pixel data in a plurality of the pixels having a width.

In addition, with respect to the adjusting point corresponding to the selected image portion, the adjusting point having the input grayscale level closest to the average value of the grayscale values for a plurality of the pixels selected by the pixel selection portion or the average value excluding the maximum and minimum grayscale values from the grayscale values for a plurality of the pixels selected by the pixel selection portion is selected. Therefore, since the influence of the pixel data including the noise can be reduced, the adjusting point corresponding to the image portion according to the user's intention can be selected.

Accordingly, in the projector 100, the adjusting portion according to the user's intention can be accurately selected from the projected image.

(14) In the "cursor" adjusting mode, the pixel selection portion 52 has a size capable of selecting, preferably, a total of nine pixels in a square shape where the three consecutive pixels are arrayed in each of the vertical and horizontal directions. Therefore, although the average value is obtained from the grayscale values excluding the pixels having the maximum and minimum grayscale values, the effective pixel data for the seven pixels can be obtained. In addition, since the pixel selection portion has a suitable size over the entire image, it can be easily visually perceived. In addition, since the pixel selection portion has a square shape, the image portion can be easily selected.

Accordingly, in the projector 100, the adjusting portion according to the user's intention can be easily and accurately selected from the projected image.

(15) In the "cursor" adjusting mode, the selection cursor 51 further includes the annular portion 53 which is disposed along the circumference of the pixel selection portion 52 to have a shape which is one-step larger than an outer portion of the pixel selection portion 52. In addition, a relative position of the annular portion 53 to the pixel selection portion 52 is always maintained constant, and the annular portion together with the pixel selection portion 52 is moved on the still image. Therefore, the selection cursor 51 has a specific shape having the annular portion 53 of which size is larger by one step than that of the pixel selection portion 52, and a large selection cursor can be distinctively displayed on the image.

In addition, the image signal processing unit 16 adjusts the color tone of the selection cursor 51 based on a color tone having high contrast among a color tone of the image portion selected by the selection cursor 51 and a color tone of one of black and white. Therefore, the color tone of the selection cursor 51 can be easily visually perceived.

Accordingly, due to the distinctively displayed selection cursor 51, a desired image portion can be easily selected.

Accordingly, in the projector 100, since the selection cursor is distinctively displayed on the image, the desired image portion can be easily selected.

(16) In the "cursor" adjusting mode, when the selection manipulation of the image portion is performed by using the selection cursor 51, the position of the pixel selection portion 52 is controlled by the image signal processing unit 16 so that the entire portions of the pixel selection portion 52 are not protruded from the still image, and when the pixel selection portion 52 reaches the edge of the still image, the selection cursor is displayed in a state that a portion of the image corresponding to the annular portion 53 protruding from the still image is excluded. Therefore, due to the selection cursor 51, the image portion in the edge of the image can be selected from the image, and although the edge of the image is selected, the selection cursor 51 can be visually perceived.

Accordingly, in the projector 100, due to the selection cursor, the desired image portion can be selected from all the effective image regions.

(17) In the "cursor" adjusting mode, the image signal processing unit 16 stops the image and displays the selection cursor 51 for selecting the desired image portion on the display unit. Even in case of a moving image where the image portion is not easy to selection due to a change of the image, since the image is stopped, so that the image portion can be easily selected. In addition, the desired image portion can be selected from the still image by using the selection cursor 51.

In addition, when the image portion is selected from the still image by the selection cursor 51, the image signal processing unit 16 blinks the selected image portion of the still image and the image portion having a grayscale substantially equal to that of the selected image portion. Therefore, these image portions are displayed so as to be distinguished from other image portions. Therefore, the selected image portion can be distinctively visually perceived. In addition, even in a case where unexpected portion is selected, the portion can be identified at a glance.

Accordingly, in the projector 100, the desired image grayscale portion can be selected from the displayed image, and the selected image portion can be distinctively visually perceived.

(18) In the "cursor" adjusting mode, the blinking of the image portion selected by the selection cursor 51 and the image portion having a grayscale substantially equal to that of the selected image portion is performed by periodically increasing and decreasing the output grayscale value at the adjusting point having the input grayscale level closest to the grayscale value of the selected image portion among a plurality of the adjusting points corresponding to the input grayscale level of the image signal representing the still image. Therefore, the selected image portion and the image portion having a grayscale substantially equal to that of the selected image portion can be blinked by using such a simple method of increasing and decreasing the output grayscale value at the one adjusting point.

Accordingly, in the projector 100, the selected image portion and the image portion selected together with the selected image portion can be visually perceived and identified by using such a simple method.

(19) The image signal processing unit 16 includes a gamma correcting unit 22 which corrects one reference grayscale characteristic among a plurality of the reference grayscale characteristics defined in advance in order to match the grayscale characteristics unique to the display unit with the visual characteristic of a human and a grayscale point adjusting unit 21 which adjusts the output grayscale value for a plurality of the adjusting points disposed according to the input levels in the reference grayscale characteristic, and each of the gamma correction unit and the grayscale point adjusting unit is constructed with one-dimensional LUT. Each of the gamma correction unit and the grayscale point adjusting unit has a simple construction having dedicated functions. Accordingly, the correction data set to each of the LUTs may be constructed to be not large complex data but simple data.

In addition, the blinking of the image portion selected by the selection cursor 51 and the image portion having a grayscale substantially equal to that of the selected image portion is performed by the grayscale point adjusting unit 21. Therefore, the image portion can be blinked without influence to the reference grayscale characteristic.

Accordingly, in the projector 100, the selected image portion and the image portion selected together with the selected image portion can be visually perceived and identified by using such a simple construction.

(20) The increment and decrement amounts of the output grayscale values used to blink the image portion at the adjusting point corresponding to the selected image portion selected by the selection cursor 51 in the "cursor" adjusting mode or at the selected adjusting point in the "graph" adjusting mode are set to be ±10% or less of the full scale of the output grayscale value of the grayscale characteristic. Therefore, due to such a suitable contrast, the image portion can be visually perceived without the fatigue of the observer's eyes. In addition, the response of the display unit can be sufficiently caught up with.

In addition, the blinking period of the image portion is set to be in a range of from 0.5 Hz to 3 Hz or less. Therefore, unpleasant feeling caused from the flicker can be prevented, and the image portion can be distinctively visually perceived.

Accordingly, in the projector 100, the selected image portion can be distinctively visually perceived without unpleasant feeling.

(21) In the "cursor" adjusting mode, the blinking period of the image portion selected by the selection cursor 51 or the blinking period of the image portion corresponding to the selected adjusting portion in the "graph" adjusting mode is in synchronization with the blinking period of the dot displayed portions of the characteristic identification screens G3 and G7.

Therefore, it can be visually perceived that the selected image portion and the dot displayed portion at the adjusting points corresponding to the characteristic identification screens G3 and G7 are equal to each other. In addition, the periods are synchronized with each other, so that the visually unpleasant feeling can be prevented.

In the image display apparatus according to the embodiment of the invention, it can be visually represented that the selected image portion corresponds to the dot displayed portion.

Second Embodiment

Procedures of Second Image Adjusting Process 1: Up to Branch Screen

Figure 14:
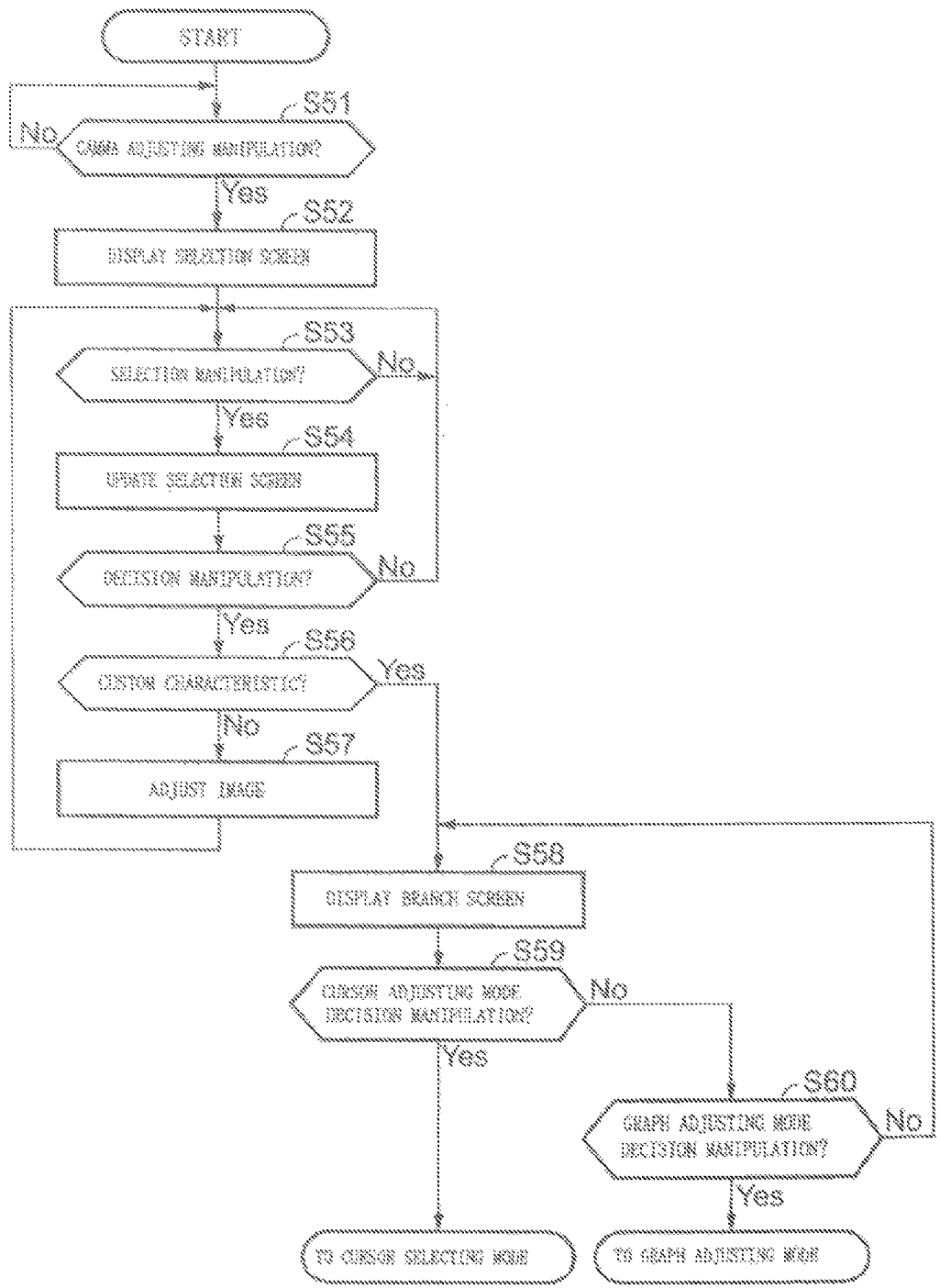
FIG. 14 is a flowchart for explaining operations of a projector at a time of performing gamma adjusting according to a second embodiment.
Figure 15A:
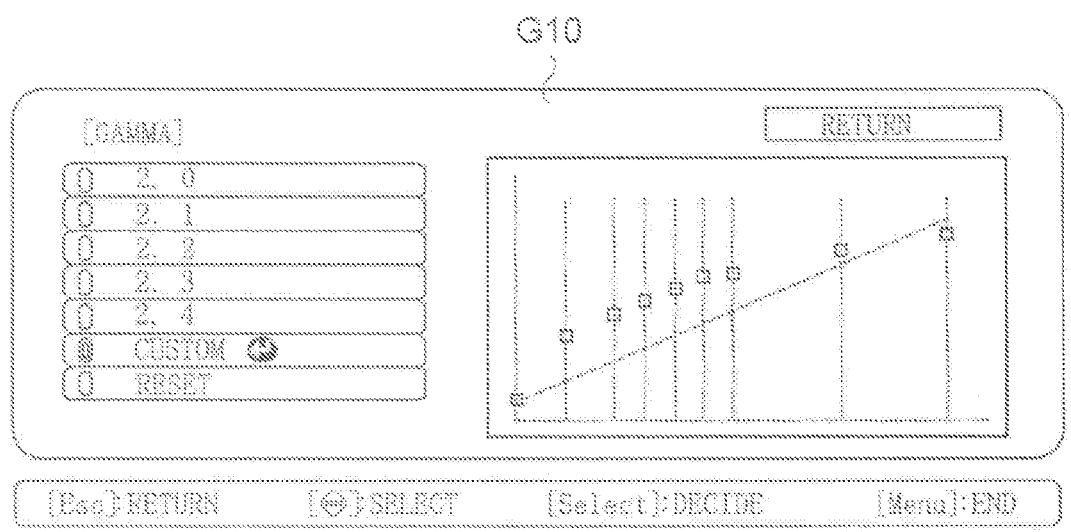
FIG. 15A is a view showing an example of a selection screen.
Figure 15B:
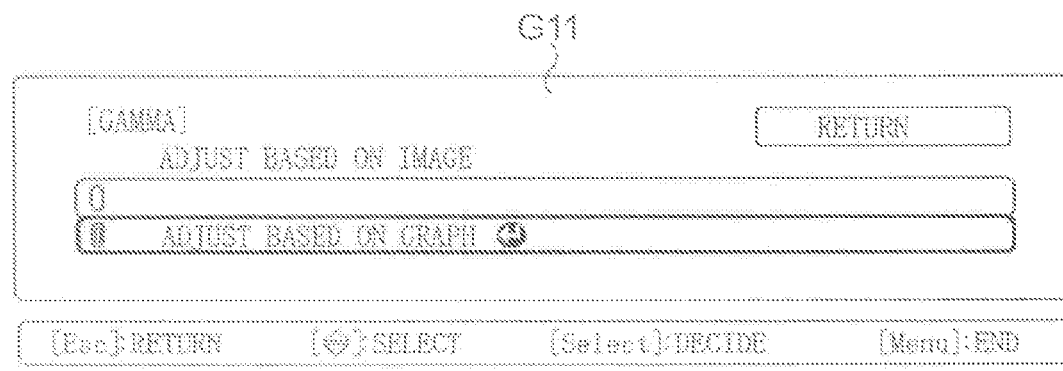
FIG. 15B is an example of a branch screen.

FIG. 14 is a flowchart for explaining operations of the projector 100 at a time of performing the "gamma" adjusting. FIG. 15A is a view showing an example of the selection screen, and FIG. 15B is a view showing an example of the branch screen.

Now, the operations of the process up to the branch screen according to the second embodiment in the image adjusting performed by the projector 100 according to the first embodiment are described with reference to mainly FIG. 14 and additionally FIGS. 15A, 15B, and 2. The same elements as those of the first embodiment are denoted by the same reference numerals, and redundant description is omitted.

The procedures and the manipulation screens in the process of the image adjusting according to the second embodiment are different from those of the process of the image adjusting according to the first embodiment. Therefore, the "grayscale adjusting program" for defining the procedures and contents of the image adjusting according to the second embodiment has functions different from those of the program according to the first embodiment. In addition, some of the manipulation screens stored in the OSD memory 18 are different from the manipulation screens according to the first embodiment. In addition, the reference γ characteristic in the "custom" characteristic is set to have a γ value of 2.4 by the manipulation of the manipulator 1 in advance.

The projector 100 is constructed with such a configuration as shown in FIG. 1 and manipulated by the manipulator 1.

In Step S51, the controller 10 determines whether or not there is a manipulation for performing the "gamma" adjusting according to a manipulation signal from the manipulation receiving unit 11. When there is the manipulation for performing the "gamma" adjusting, the process proceeds to Step S52. Where there is not manipulation, the manipulation is waited for. The "grayscale adjusting program" of the storage unit 14 is started by the manipulation, and the following processes are performed according toe the procedures and contents of the grayscale characteristic defined in the program.

In Step S52, the controller 10 allows the image signal processing unit 16 to overlap the selection screen G10 shown in FIG. 15A with the image signal.

The selection screen G10 is the same as the selection screen G1 shown in FIG. 7A. On the selection screen G10, a state that the "custom" characteristic is selected is displayed, but the graph is a curved line unlike the graph displayed on the selection screen G1. This is because the reference γ characteristic in the "custom" characteristic is set to have a γ value of 2.4, and the γ value of 2.4 is represented on the scale of the graph having the γ value of 2.2 as a reference straight characteristic.

In Step S53, the controller 10 determines whether or not there is a selection manipulation of selecting one characteristic from the selection items of the grayscale characteristics on the selection screen G10 based on the manipulation signal from the manipulation receiving unit 11. When there is a selection manipulation, the process proceeds to Step S54. When there is no selection manipulation, the manipulation is waited for.

In Step S54, the controller 10 allows the image signal processing unit 16 to update the selection screen G10 according to the adjusted contents. The updated contents of the selection screen 810 includes selecting and displayed the indication (for example, 2.3) representing the selected grayscale characteristic at the lower left side of the screen. In this step, the grayscale adjusting of the background image is not performed.

In Step S55, the controller 10 determines whether or not there is a decision manipulation of deciding the selected grayscale characteristic based on the manipulation signal from the manipulation receiving unit 11. When there is the decision manipulation, the process proceeds to Step S56. When there is no decision manipulation, the process returns to Step S53, so that the selection manipulation is received unit the decision manipulation is performed.

In Step S56, the controller 10 determines whether or not the decided grayscale characteristic is the "custom" characteristic. When there is the "custom" characteristic, the process proceeds to Step S58. When there is no "custom" characteristic, the process proceeds to Step S57. In addition, when there is the "custom" characteristic, the operations of from an operation of proceeding to a process for changing the grayscale characteristic, that is, a correlation between the input grayscale value and the output grayscale value to an manipulation of selecting and deciding the "custom" characteristic correspond to a starting manipulation for starting changing the correlation.

In Step S57, the controller 10 sets the γ correction data of the selected grayscale characteristic to the LUT of the gamma correcting unit 22 and project the image adjusted according to the grayscale characteristic. Next, the process returns to Step S53, so that a manipulation of selecting the grayscale characteristic is waited for again. In the step, the image projected on a background of the selection screen G10 becomes the image adjusted according to the selected grayscale characteristic, and the graph representing the selected grayscale characteristic is displayed on the selection screen G10. In order to end the adjusting, the "Menu" button of the manipulator 1 or the remote controller 2 is pushed according to the display in the lower portion of the selection screen G10.

Next, a case of the "custom" characteristic in Step S56 is described.

In Step S58, the controller 10 allows the image signal processing unit 16 to overlap the branch screen G11 shown in FIG. 15B with the image signal. The branch screen G11 is the same as the branch screen G2 shown in FIG. 7B. On the branch screen G11, the graph adjusting mode is selected.

In Step S59, the controller 10 determines whether or not there is a selection decision manipulation of selecting and deciding the "cursor" adjusting mode based on the manipulation signal from the manipulation receiving unit 11. When there is the selection decision manipulation, the process proceeds to a subroutine of "cursor" adjusting mode. When there is no selection decision manipulation, the process proceeds to Step S60.

In Step S60, the controller 10 determines whether or not there is a selection decision manipulation of selecting and deciding the "graph" adjusting mode based on the manipulation signal from the manipulation receiving unit 11. When there is the selection decision manipulation, the process proceeds to a subroutine of the "graph" adjusting mode. When there is not selection decision manipulation, the process returns to Step S58 and waits for the selection and decision manipulations.

Procedures of Second Image Adjusting Process 2: Cursor Adjusting Mode

Figure 17A:
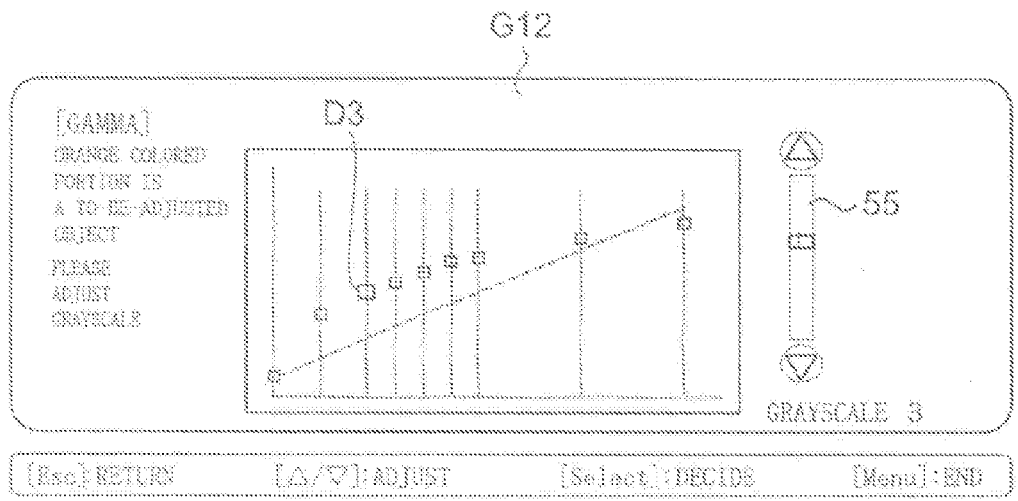
FIGS. 17A and 17B are views showing examples of a graph adjusting screen.
Figure 17B:
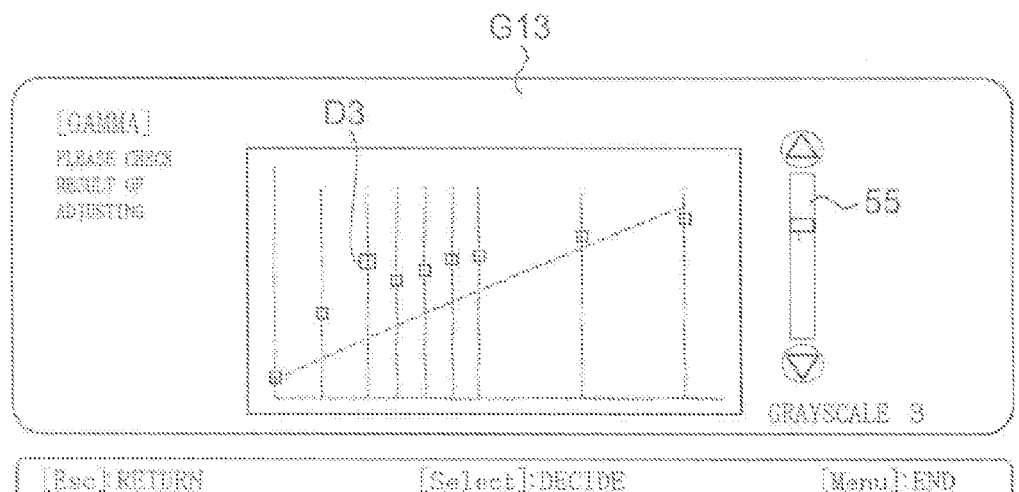
Figure 17C:
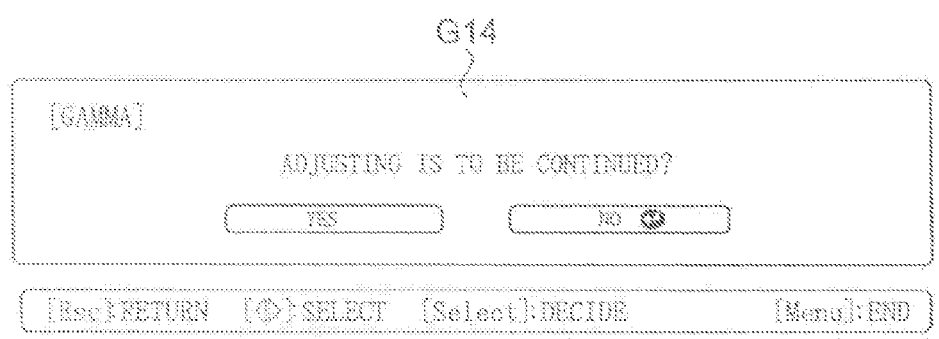
FIG. 17C is a view showing an example of a continuation identification screen.

FIG. 16 is a flowchart for explaining operations at a time of customizing the grayscale characteristic in the "cursor" adjusting mode. FIGS. 17A and 17B are views showing an example of the graph adjusting screen, and FIG. 17C is a view showing an example of a continuation identification screen.

Now, the operations in the "cursor" adjusting mode of the image adjusting of the projector 100 according to the second embodiment are described with reference to mainly FIG. 16 and additionally FIGS. 17A, 17B, 17C, and 2.

In Step S71, the controller 10 allows the image signal processing unit 16 to stop the image. This is because a moving image is not easy to select an image portion thereof.

In Step S72, the controller 10 allows the image signal processing unit 16 to overlap the "selection cursor" with the image signal. This state is the same as that of the selection cursor 51 on image in the screen SC shown in FIG. 1.

In Step S73, the controller 10 determines whether or not there is an image selection manipulation of selecting a predetermined image portion by the "selection cursor" based on the manipulation signal from the manipulation receiving unit 11. When there is the image selection manipulation, the process proceeds to Step S74. When there is no image selection manipulation, the image selection manipulation is waited for.

In Step S74, the controller 10 allows the image signal processing unit 16 to blink the selected image portion and an image portion having a grayscale substantially equal to that of the selected image portion and overlap the graph adjusting screen G12 shown in FIG. 17A with the image signal.

In the process, firstly, the controller 10 reads out the image data for the RGB colors of the selected image portion selected by the "selection cursor" from the frame memory 17 and obtains the luminescence signal data (Y signal data) from the image data of the pixels. Next, the controller obtains an average value of the Y signal data excluding the maximum and minimum grayscale values from the Y signal data of the pixels. Next, the adjusting point closet to the obtained Y signal data is selected as the to-be-adjusted adjusting point.

In addition, the blinking of the image portion is performed by changing the output grayscale value of the selected adjusting point in the "grayscale correction date" of the grayscale point adjusting unit 21 (LUT) in a period of 1 Hz at plus 32 counts and minus 32 counts of the initial output grayscale value.

In addition, on the graph adjusting screen G12, a state that the adjusting point "grayscale 3" is selected is displayed, and a dot displayed portion D3 of the adjusting point "grayscale 3" has such a color tone as orange different from the color tone (white) of other dot displayed portions. Alternatively, a method of displaying the dot displayed portion may be an inverted blinking of the dot displayed portion in synchronization with the blinking of the image portion.

On the graph adjusting screen G12, a text, "the orange colored portion is a to-be-adjusted object. Please adjust the grayscale." is displayed to urge the adjusting, and an indicator 55 for identifying the adjusting state of the adjusting point corresponding to the selected image portion is additionally disposed. The indicator 55 enlarges the displayed adjusting state involved with the moving-up and moving-down of the dot displayed portion of the selected adjusting point according to the adjusting.

In addition, the position and size of the graph adjusting screen G12 displayed on the image are the same as those of the characteristic identification screen G3 shown in FIG. 11 and controlled so as not to overlap the image portion selected by the selection cursor 51 by the image signal processing unit 16.

In step S75, the controller 10 determines whether or not there is a manipulation of adjusting the output grayscale value based on the manipulation signal from the manipulation receiving unit 11. When there is the adjusting manipulation, the process proceeds to Step S76. When there is no adjusting manipulation, the adjusting manipulation is waited for.

In Step S76, the controller 10 allows the image signal processing unit 16 to stop the blinking of the image portion, sequentially corrects the "grayscale correction data" according to the adjusting manipulation, sets the corrected "grayscale correction data" to the LUT of the grayscale point adjusting unit 21, and performs the adjusting of the image signal based on the grayscale characteristic. In addition, the graph adjusting screen is updated, and as shown in the graph adjusting screen G13 of FIG. 17B, the graph representing the adjusted contents is displayed, so that a text, "please check the adjusting result" is displayed. In this step, the image projected on a background of the grayscale adjusting screen G13 becomes the image adjusted in real-time according to the grayscale characteristic corresponding to the adjusted contents.

In Step S77, the controller 10 determines whether or not there is a manipulation of deciding the adjusted contents based on the manipulation signal from the manipulation receiving unit 11. When there is the decision manipulation, the process proceeds to Step S78. When there is no decision manipulation, the process returns to Step S75 and receives the adjusting manipulation until there is the decision manipulation.

In addition, when there is the decision manipulation, the adjusted contents are stored as the "grayscale correction data" of the "custom" characteristic in the storage unit 14.

In Step S78, the controller 10 allows the image signal processing unit 16 to overlap the continuation identification screen G14 shown in FIG. 17C with the image signal. On the continuation identification screen G14, an identification indicator for determining whether or not the adjusting of the "cursor" adjusting mode is continued is displayed.

In Step S79, the controller 10 determines whether or not there is a manipulation of continuing the adjusting based on the manipulation signal from the manipulation receiving unit 11. When there is the continuation manipulation, the process returns to Step S72 and continues the adjusting of the "cursor" adjusting mode by using the previously adjusted "grayscale correction data" as base data. When there is no continuation manipulation, the continuation identification screen G14 is closed, so that the adjusting of the "cursor" adjusting mode ends.

Procedures of Image Adjusting Process 3: Graph Adjusting Mode

Figure 18:
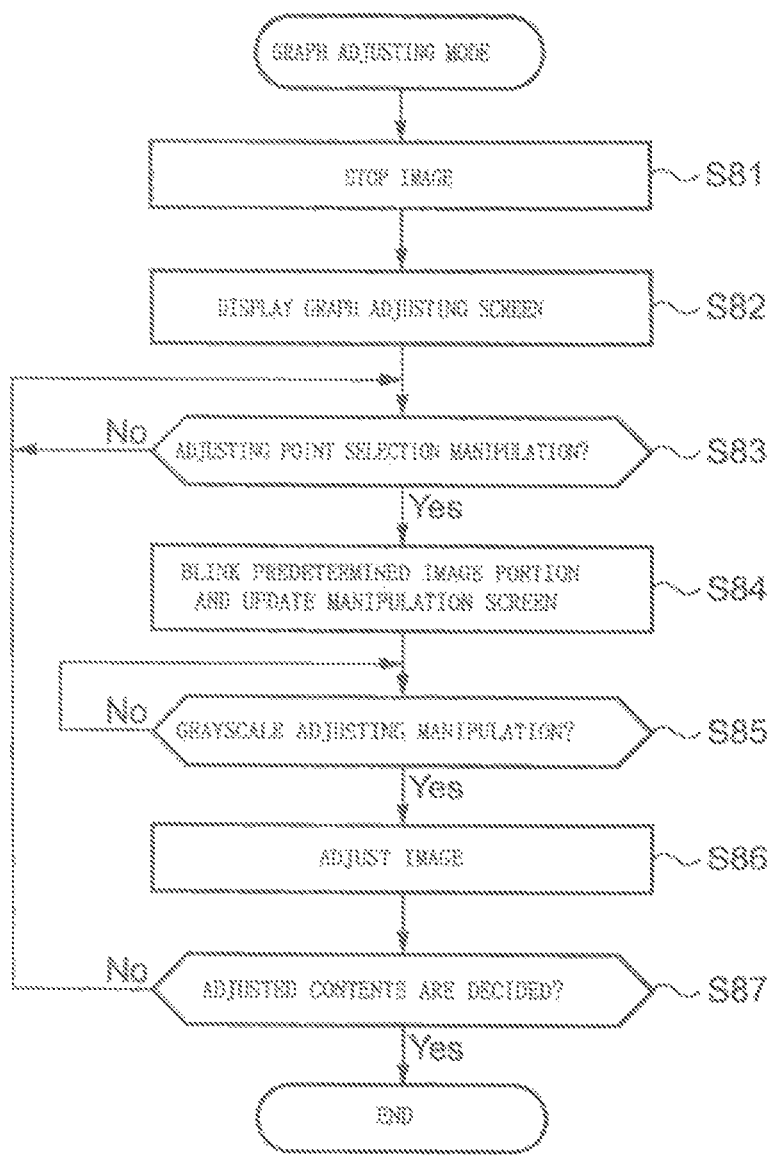
FIG. 18 is a flowchart for explaining operations of customizing a grayscale characteristic in a graph adjusting mode.
Figure 19A:
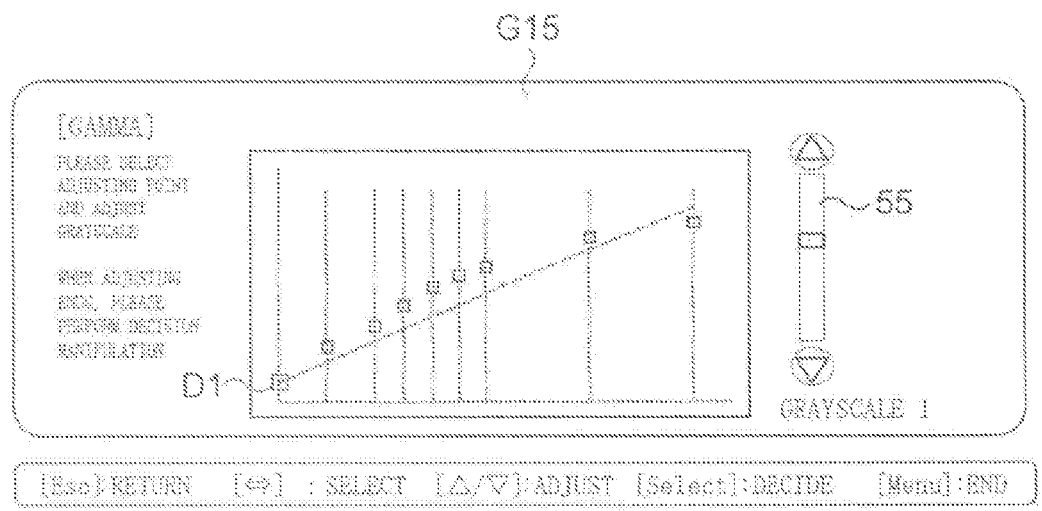
FIGS. 19A and 19B are views showing examples of a graph adjusting screen.
Figure 19B:
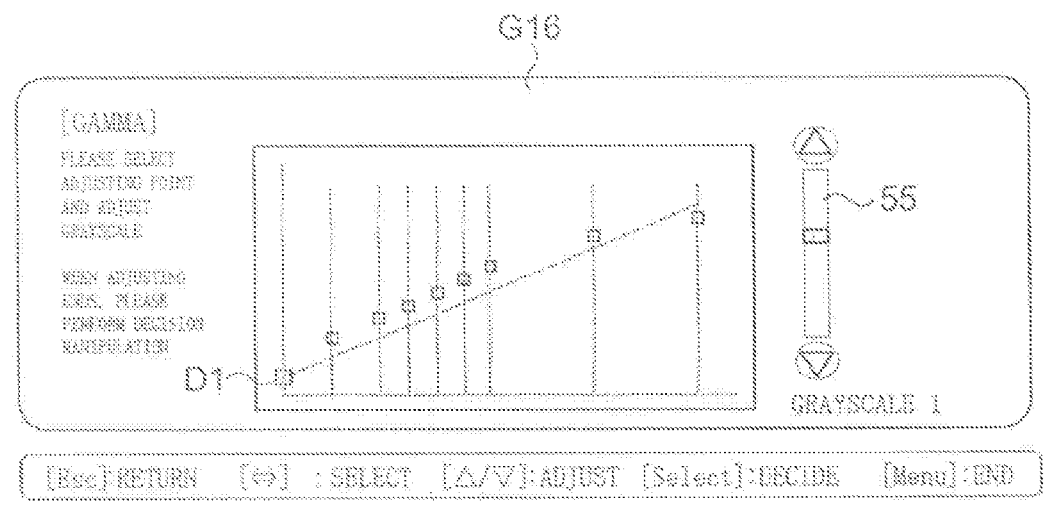

FIG. 18 is a flowchart for explaining operations at a time of customizing the grayscale characteristic in the "graph" adjusting mode. FIGS. 19A and 19B are views showing an example of the graph adjusting screen.

Now, the operations at the time of customizing the grayscale characteristic in the "graph" adjusting mode are described with reference to mainly FIG. 18 and additionally FIGS. 19A, 19B, and 2.

In Step S81, the controller 10 allows the image signal processing unit 16 to stop the image. This is because a moving image is not easy to select an image portion thereof.

In Step S82, the controller 10 allows the image signal processing unit 16 to overlap the graph adjusting screen G15 shown in FIG. 19A with the image signal. On the graph adjusting screen G15, the adjusting point "grayscale 1" is displayed in a selected state, and the image portion corresponding to the adjusting point "grayscale 1" is blinked in a period of 1 Hz. In addition, a dot displayed portion D1 of the adjusting point "grayscale 1" has such a color tone as orange different from the color tone (white) of other dot displayed portions.

On the graph adjusting screen G15, a manipulation guidance text is displayed, and an indicator 55 for identifying the adjusting situation of the selected adjusting point is additionally provided.

In Step S83, the controller 10 determines whether or not there is a manipulation of selecting the adjusting points based on the manipulation signal from the manipulation receiving unit 11. When there is the selection manipulation, the process proceeds to Step S84. When there is no selection manipulation, the selection manipulation is waited for.

In Step S84, the controller 10 allows the image signal processing unit 16 to blink the image portion corresponding to the selected adjusting portion in a period of 1 Hz. In the graph adjusting screen, the color tone of the dot displayed portion of the selected adjusting point is charged into orange. In addition, the blinking of the image portion is performed by changing the output grayscale value of the selected adjusting point in the "grayscale correction date" of the grayscale point adjusting unit 21 (LUT) in a period of 1 Hz at plus counts and minus 32 counts of the initial output grayscale value.

In step 85, the controller 10 determines whether or not there is a manipulation of adjusting the output grayscale value based on the manipulation signal from the manipulation receiving unit 11. When there is the adjusting manipulation, the process proceeds to Step S86. When there is no adjusting manipulation, the adjusting manipulation is waited for.

In step S86, the controller 10 sequentially corrects the "grayscale correction data" according to the adjusting manipulation, sets the corrected "grayscale correction data" to the LUT of the grayscale point adjusting unit 21, and performs the correction of the image signal based on the grayscale characteristic. Next, the graph adjusting screen is updated again, and the graph representing the adjusted contents is displayed. In this step, the image projected on a background of the graph adjusting screen becomes the image adjusted in real-time according to the grayscale characteristic corresponding to the adjusted contents.

In Step S87, the controller 10 determines whether or not there is a manipulation of deciding the adjusted contents based on the manipulation signal from the manipulation receiving unit 11. When there is the decision manipulation, the graph adjusting screen G16 is closed, so that the adjusting ends. When there is no decision manipulation, the process returns to Step S83 and receives the selection and adjusting manipulations until the decision manipulation is performed.

The graph adjusting screen G16 shown in FIG. 19B represents a state that a plurality of the selection and adjusting manipulation are performed. Since the output grayscale values of adjusting points "grayscale 2 to 7" are adjusted by using a plurality of the adjusting, the customized grayscale characteristic becomes different from the grayscale characteristic as a base of the graph adjusting screen G15.

In the embodiment, the OSD unit 20 which overlaps the branch screen G11, the graph adjusting screens G12, G13, G15, and G16, and the selection cursor on the projected image after the "custom" characteristic is selected among a plurality of the grayscale characteristics displayed on the selection screen G10, the manipulator 1 which receives the manipulations according to the screens, and the controller 10 which controls the OSD unit 20 and the manipulator 1 and corrects the "grayscale correction data" according to the manipulation contents of the manipulator 1 correspond to the grayscale characteristic changing unit according to the embodiment of the invention.

According to the aforementioned invention, the following advantages as well as the advantages of the first embodiment can be obtained.

(1) When the custom characteristic is selected, in any adjusting mode of the "cursor" adjusting mode and the "graph" adjusting mode, the graph adjusting screens G12 and G15 including the graph representing the initial setting of the custom characteristic are displayed, and the graph adjusting screens G12 and G15 represent the output grayscale levels at a plurality of the adjusting points disposed according to the input grayscale levels and have a plurality of the dot displayed portions for adjusting the grayscale characteristic. Therefore, due to the graph adjusting screens G12 and G15, the grayscale characteristic can be adjusted while the grayscale characteristic in the initial setting of the custom characteristic is identified.

Accordingly, in the projector 100, the image adjusting can be performed according to the user's preferences while the grayscale characteristic is identified by using the graph.

(2) The image signal processing unit 16 blinks the image portion corresponding to the selected adjusting point in a period of 1 Hz and changes the color tone of the dot displayed portion at the selected adjusting point on the graph adjusting screens G12 and G15 into orange. Therefore, it can be visually perceived that the blinking image portion corresponds to the orange colored grayscale point in the grayscale characteristic.

Accordingly, in the projector 100, it can be visually represented that the selected image portion corresponds to the dot displayed portion.

(3) When the adjusting manipulation of the grayscale levels on the graph adjusting screens G12 and G15 is performed, the image signal processing unit 16 sequentially adjusts the grayscale value of the image portion corresponding to the adjusting portion of the still image according to the output grayscale level which is subjected to the adjusting manipulation. The image including the adjusted contents can be visually identified in the step of performing the adjusting.

In addition, due to the graphs of the graph adjusting screens G12 and G15 and the indicator 55, the adjusting state of the grayscale characteristic can be identified in real-time.

Accordingly, in the projector 100, the image including the adjusting state and the adjusted state of the grayscale characteristic can be identified in real-time in the step of performing the adjusting.

(4) The manipulation screens displayed in the "graph" adjusting mode are only the graph adjusting screens G15 and G16, and all the adjusting manipulations can be implemented by using one type of the manipulation screen. Therefore, the manipulation can be effectively performed.

In addition, after the adjusting for one adjusting point is completed, the decision manipulation, the continuation identification manipulation, or the like is not needed, so that the adjusting at the other adjusting points can be continuously performed. Therefore, the adjusting efficiency can be improved. In addition, since the adjusted grayscale characteristic can be visually perceived in real-time by using the graph and the image, the adjusting state can be easily identified.

Accordingly, the projector 100 can be conveniently used, and the image adjusting can be performed according to the user's preferences.

The invention is not limited to the aforementioned embodiments, but various modification and changes of the aforementioned embodiments are available. Hereinafter, modified examples of the invention are described.

Modified Example 1

Modified Example 1 is described with reference to FIG. 2. In the aforementioned embodiments, the selection of the image portion or the adjusting of the output grayscale value in the cursor selection mode is performed by using the "up" and "down" buttons or the "left" and "right" buttons of the manipulator 1 or the remote controller 2. However, the invention is not limited thereto. For example, a track ball as a pointing device is provided to the remote controller 2, and a device driver corresponding to the track ball is stored in the storage unit 14. By manipulating the track ball, the selection of the image portion or the adjusting operation for the output grayscale value may be performed.

In such a construction of the projector 100, the adjusting manipulation can be efficiently performed.

Modified Example 2

Modified Example 2 is described with reference to FIG. 2. In the aforementioned embodiments and the modified example, the "grayscale point adjusting" and the "γ correction" is performed by using the Y signal among the YUV signals. However, the invention is not limited thereto.

For example, a luminescence table which is used to apply luminescence date for each of the color signals based on the pixel data for RGB signals is provided in the storage unit 14, and the "grayscale point adjusting" and the "γ correction" may be performed by using the luminescence data for the RGB signals.

In such a construction, advantages same as those of the aforementioned embodiments and modified example can be obtained.

Modified Example 3

Modified Example 3 is described with reference to FIG. 2. In the aforementioned embodiments and the modified examples, the projector 100 is exemplified as a three-plate type liquid crystal projector using three plates of the liquid crystal light valves 5R, 5G, and 5B as optical modulation devices. The invention is not limited thereto.

For example, the projector may be a single-plate type liquid crystal light valve which is constructed by regularly disposing red, green, and blue color filters in a lattice shape and extracting modulated light having a full color with a single plate. In addition, the projector may be constructed with a reflective liquid crystal display apparatus or a tilt mirror device. In addition, the projector may be a rear type projector having such an optical modulation device and the screen.

In such a construction, advantages same as those of the aforementioned embodiments and modified example can be obtained.

Modified Example 4

Modified Example 4 is described with reference to FIG. 2. In the aforementioned embodiments and the modified examples, the image display apparatus is exemplified as the projector. The invention is not limited thereto. Any image display apparatus for displaying an image displayed according to input image signals on a display unit may be used.

For example, CRT displays, liquid crystal displays, plasma displays, organic EL displays, field emission displays or the like may be used, and advantages same as those of the aforementioned embodiments and modified example can be obtained.

What is claimed is:

1. A projector comprising:
a display unit which displays a moving image based on an image signal;
an image signal processing unit which stops the moving image and displays a selection cursor to overlap the displayed image displayed by the display unit, the selection cursor selecting a desired image portion of the displayed image;
a manipulator which is used to select the desired image portion using the selection cursor; and
a changing unit that changes a defined correlation between the input and the output grayscale values,
wherein the image signal processing unit displays a graph after the desired image portion is selected by the selection cursor, and adjusts input grayscale values of the selected desired image portion according to the defined correlation between the input and output grayscale values,
wherein the graph includes a plurality of adjusting points, and one adjusting point corresponding to the grayscale value of the desired image portion is blinked on the graph and
wherein the image processing unit performs one of a cursor adjusting correction and a graph adjusting correction, the cursor adjusting correction being performed after selection of the desired image portion of the displayed image, the graph adjusting correction being performed without selection of the desired image portion of the displayed image.

2. The projector according to claim 1, wherein
the image signal processing unit displays a grayscale adjusting screen to adjust at least one of the grayscale values of the selected desired image portion.

3. The projector according to claim 2, wherein
the image signal processing unit displays the grayscale adjusting screen to overlap the displayed image.

4. The projector according to claim 1, wherein
the image signal processing unit adjusts a grayscale value of another image portion which corresponds to at least one of the grayscale values of the selected desired image portion.

5. The projector according to claim 1, wherein the image signal processing unit blinks the selected image portion.

6. The projector according to claim 5, wherein the image signal processing unit stops the blinking of the selected image portion after a predetermined time, and overlaps the graph with the image signal.

7. An image adjusting method for a projector, the method comprising:
 displaying a moving image by a display unit based on an image signal;
 stopping the moving image and displaying a selection cursor to overlap the displayed image displayed by the display unit, the selection cursor selecting a desired image portion of the image;
 selecting the desired image portion using the selection cursor;
 displaying a graph after the desired image portion is selected by the selection cursor;
 changing a defined correlation between the input and the output grayscale values;
 adjusting input grayscale values of the selected desired image portion according to the defined correlation between the input and output grayscale values; and
 performing one of a cursor adjusting correction and a graph adjusting correction,
  wherein the graph includes a plurality of adjusting points, and one adjusting point corresponding to the grayscale value of the desired image portion is blinked on the graph, and
  wherein the cursor adjusting correction is performed after selection of the desired image portion and the graph adjusting correction is performed without selection of the desired image portion.

* * * * *